(12) United States Patent
Sato et al.

(10) Patent No.: US 6,877,058 B2
(45) Date of Patent: Apr. 5, 2005

(54) INFORMATION PROCESSING UNIT HAVING A SLOT, INFORMATION PROCESSING METHOD FOR AN INFORMATION PROCESSING UNIT, AND PROGRAM THAT CONTROLS AN INFORMATION PROCESSING UNIT

(75) Inventors: Takashi Sato, Tokyo (JP); Akira Iguchi, Kanagawa (JP); Hidenori Yamaji, Tokyo (JP); Junko Saito, Tokyo (JP); Masahiko Suzuki, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/278,933

(22) Filed: Oct. 24, 2002

(65) Prior Publication Data

US 2003/0087541 A1 May 8, 2003

(30) Foreign Application Priority Data

Oct. 30, 2001 (JP) .................................... P2001-332392

(51) Int. Cl.$^7$ ............................................ G06F 13/00
(52) U.S. Cl. ...................... 710/301; 710/302; 713/324
(58) Field of Search ................................ 710/302, 304, 710/115, 13, 62, 300, 301; 713/300

(56) References Cited

U.S. PATENT DOCUMENTS 6,168,077 B1 * 1/2001 Gray et al. .................. 235/375
6,385,677 B1 * 5/2002 Yao ............................. 711/115
6,557,106 B1 * 4/2003 Yuzawa et al. ............. 713/300
6,567,875 B1 * 5/2003 Williams et al. ............ 710/302
6,594,721 B1 * 7/2003 Sakarda et al. ............. 710/304

* cited by examiner

Primary Examiner—Mark H. Rinehart
Assistant Examiner—Clifford Knoll
(74) Attorney, Agent, or Firm—Rader, Fishman & Grauer PLLC; Ronald P. Kananen

(57) ABSTRACT

An information processing unit is adapted to connect a USB device provided on a board to a USB host controller only when it is actually used. Based on a signal regarding an n-th pin received from a USB MEMORYSTICK slot provided in a board, a monitoring program detects whether a MEMORYSTICK has been inserted. The monitoring program causes a hardware bus switch to turn ON if the presence of the MEMORYSTICK is detected, or causes the hardware bus switch to turn OFF if the absence of the MEMORYSTICK is detected. If the hardware bus switch is turned ON, the USB host controller is electrically connected to a USB MEMORYSTICK slot through a USB bus; therefore, the USB host controller detects the USB MEMORYSTICK slot. If the hardware bus switch is turned OFF, the USB host controller is electrically disconnected from the USB MEMORYSTICK slot, so that it does not detect the USB MEMORYSTICK slot.

11 Claims, 17 Drawing Sheets

INFORMATION PROCESSING UNIT HAVING A SLOT, INFORMATION PROCESSING METHOD FOR AN INFORMATION PROCESSING UNIT, AND PROGRAM THAT CONTROLS AN INFORMATION PROCESSING UNIT

BACKGROUND OF THE INVENTION

1. Field of the Invention

The present invention relates to an information processing unit, an information processing method, and a program. More particularly, the invention relates to an information processing unit, an information processing method, and a program ideally used in a case where a slot for mounting a variety of devices, such as a storage device, is provided in a control board.

2. Description of the Related Art

In a personal computer to which a universal serial bus (USB) device can be connected, a connection port for the USB device is connected to a USB host controller. If the USB device is connected to the connection port for the USB device, i.e., if a USB connector is connected, then the USB host controller sends, for example, 3,000 to 4,000 (depending upon each personal computer) interrupts per second to a central processing unit (CPU).

A small personal computer drivable by batteries is required to consume less power in order to enable a user to carry it and use it as long as possible at a desired place. To meet such a demand, according to the art disclosed in Japanese Unexamined Patent Application Publication No. 2000-10907, if no USB device is connected to a USB port, that is, if no connector is connected, then the function of the USB host controller is suspended. The art makes it possible to restrain wasteful power consumption by the USB host controller so as to prolong the operating time in a battery-driven mode.

In a personal computer, if, for example, a slot or other USB device for mounting a storage device or the like is connected to a USB host controller and provided on a control board beforehand, then the USB device cannot be detached, so that it is always in connection with the USB host controller. This means that the USB host controller constantly detects the USB device on the board regardless whether the USB device is in operation, and therefore sends, for example, 3,000 to 4,000 interrupts per second to a CPU.

The CPU has a plurality of operation modes to control power consumption. For instance, PENTIUM II (registered trademark) or PENTIUM III (registered trademark) has four operation modes, C0, C1, C2, and C3. In the operation mode C0, the CPU operates at full speed. C1 denotes a mode called "AutoHALT," C2 denotes a mode called "QuickStart," and C3 denotes a mode called "DeepSleep." The power is consumed less in C2 than C1, and less in C3 than C2. For the CPU to be set to the C3 mode, the frequency of interrupts sent to the CPU must be, for example, less than about 200 per second, although it depends on the type of CPU and the types of its peripheral devices.

Hence, if a USB device is provided on a control board, then CPU cannot change its setting to a low power consumption mode (e.g., the C3 status).

SUMMARY OF THE INVENTION

Accordingly, the present invention has been made with a view toward solving the problem described above, and it is an object of the present invention to make it possible to prevent a USB host controller from detecting a slot not in service by controlling the electrical connection and disconnection between the slot and the USB host controller by detecting the service state of the slot even in such a case where a slot for mounting a storage device that is connected by using, for example, a USB, is unremovable because it is provided on a control board beforehand.

To this end, according to one aspect of the present invention, an information processing unit is provided that has a slot into which another device is connected and includes: a device controlling means that is connectable to a predetermined device including the slot, detects the predetermined device through electrical connection with the predetermined device, and controls the processing of the predetermined device; a switching means for electrically connecting or disconnecting the device controlling means to or from the slot; a detecting means for detecting whether the slot is in use; and a controlling means for controlling the switching of the electrical connection and disconnection between the device controlling means and the slot by the switching means on the basis of a detection result provided by the detecting means.

According to another aspect of the present invention, an information processing method for an information processing unit is provided, the information processing unit including: a slot to which another device is connected; a controller that is connectable to a predetermined device including the slot, and detects a predetermined device through electrical connection with the predetermined device so as to control the processing of the predetermined device; and a switch for switching between electrical connection and disconnection between the controller and the slot, the information processing method including: a detection step for detecting whether the slot is in use; and a controlling step for controlling the switching of the electrical connection and disconnection between the controller and the slot by the switch on the basis of a detection result from the processing in the detection step.

According to still another aspect of the present invention, a program is provided that is executable by a computer that controls an information processing unit including a slot to which another device is connected; a controller that is connectable to a predetermined device including the slot, and detects a predetermined device through electrical connection with the predetermined device so as to control the processing of the predetermined device; and a switch for changeover of electrical connection and disconnection between the controller and the slot, the program including: detection processing for detecting whether the slot is in use; and a control processing for controlling the changeover of the electrical connection and disconnection between the controller and the slot by the switch on the basis of a detection result from the detection processing.

According to a further aspect of the present invention, an information processing unit is provided that includes: a connector to which a predetermined device is connected; a controller electrically connected to the connector; a switch disposed between the controller and the connector; and a controlling device that is connected to the connector and the switch, receives from the connector a status signal representing the connection state of the predetermined device to the connector, and outputs to the switch a control signal instructing to open or close the switch on the basis of the status signal, wherein the switch controls the electrical connection between the controller and the connector in response to a control signal from the control device.

In the information processing unit, the information processing method, and the program according to the present invention, the electrical connection and disconnection between a controller, which is connectable to a predetermined device including a slot according to a predetermined standard, and a slot is physically switched. Whether the slot is in use is detected, and physical switching of the electrical connection and disconnection between the controller and the slot is controlled on the basis of a detection result.

DESCRIPTION OF THE PREFERRED EMBODIMENTS

Referring to the accompanying drawings, an embodiment in accordance with the present invention will be explained.

FIG. 1 through FIG. 4 show the appearance of a personal computer 1.

Figure 1:
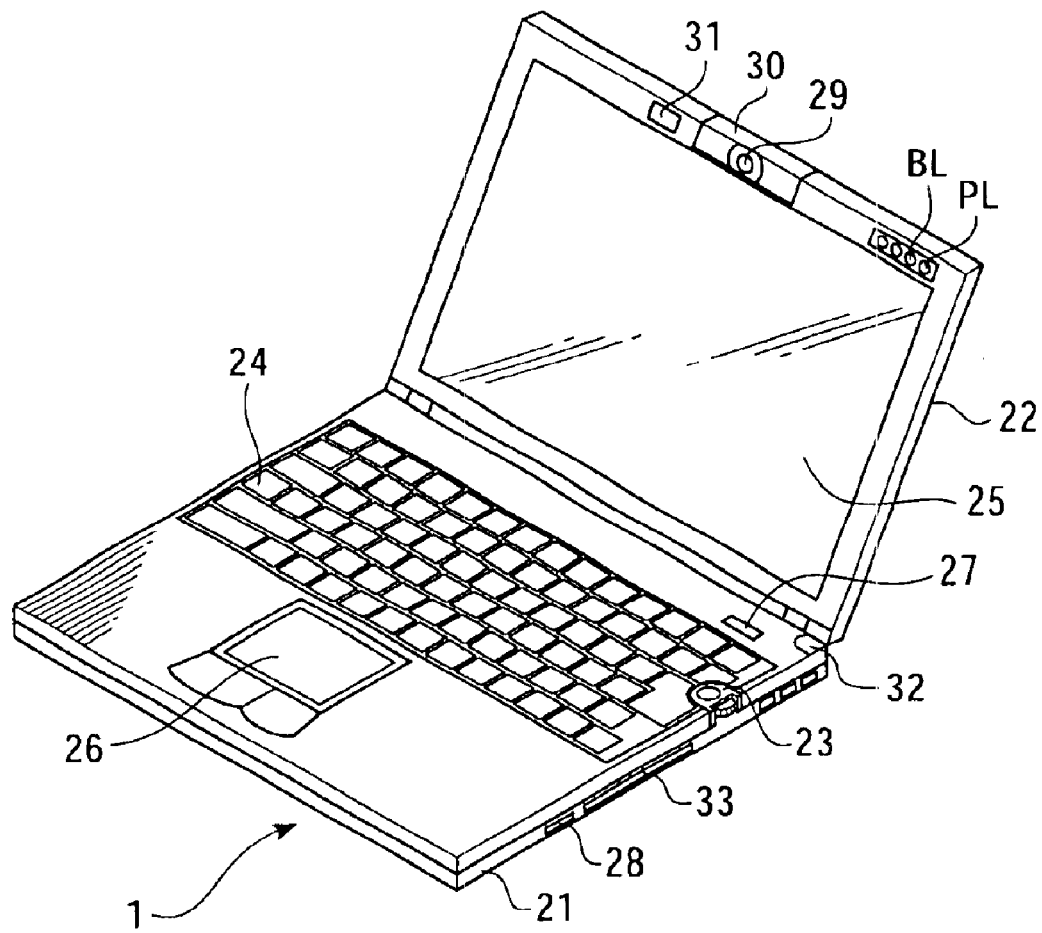
FIG. 1 is an external perspective view of a personal computer.
Figure 2:
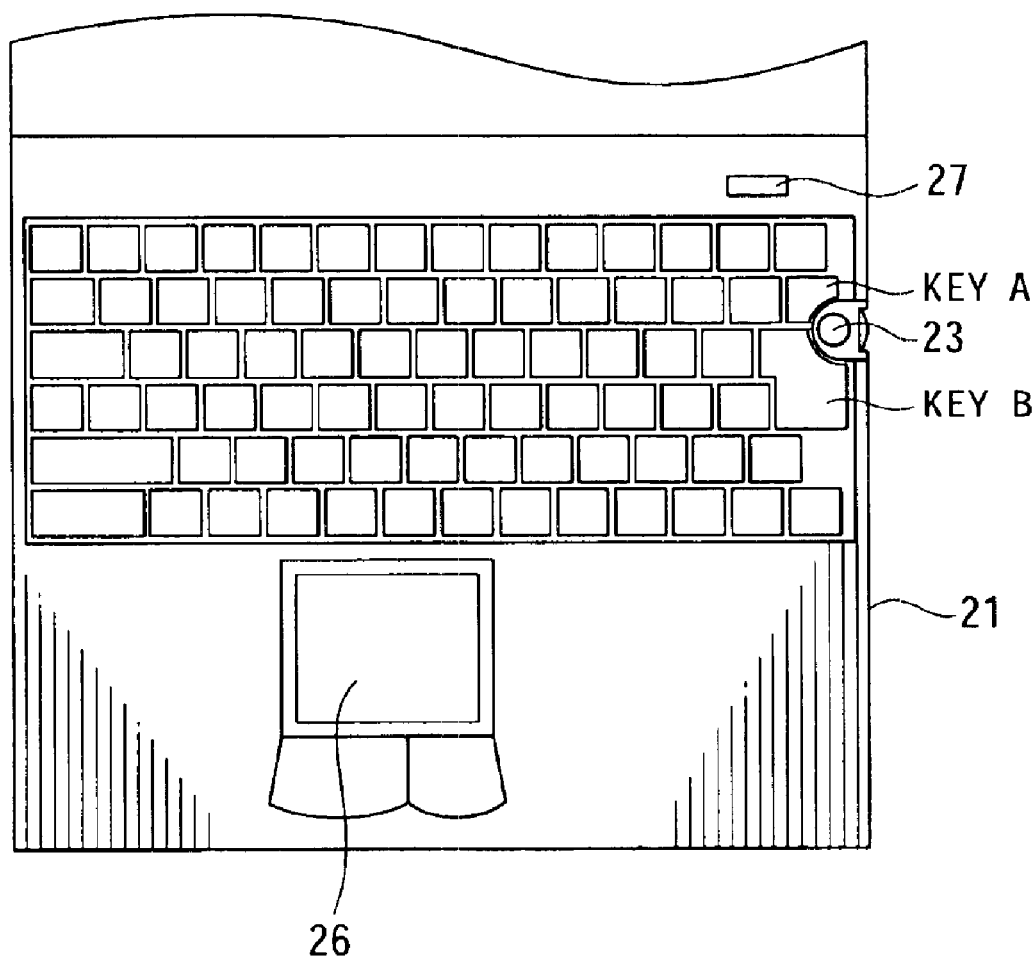
FIG. 2 is a top plan view of a main unit of the personal computer shown in FIG. 1.
Figure 3:
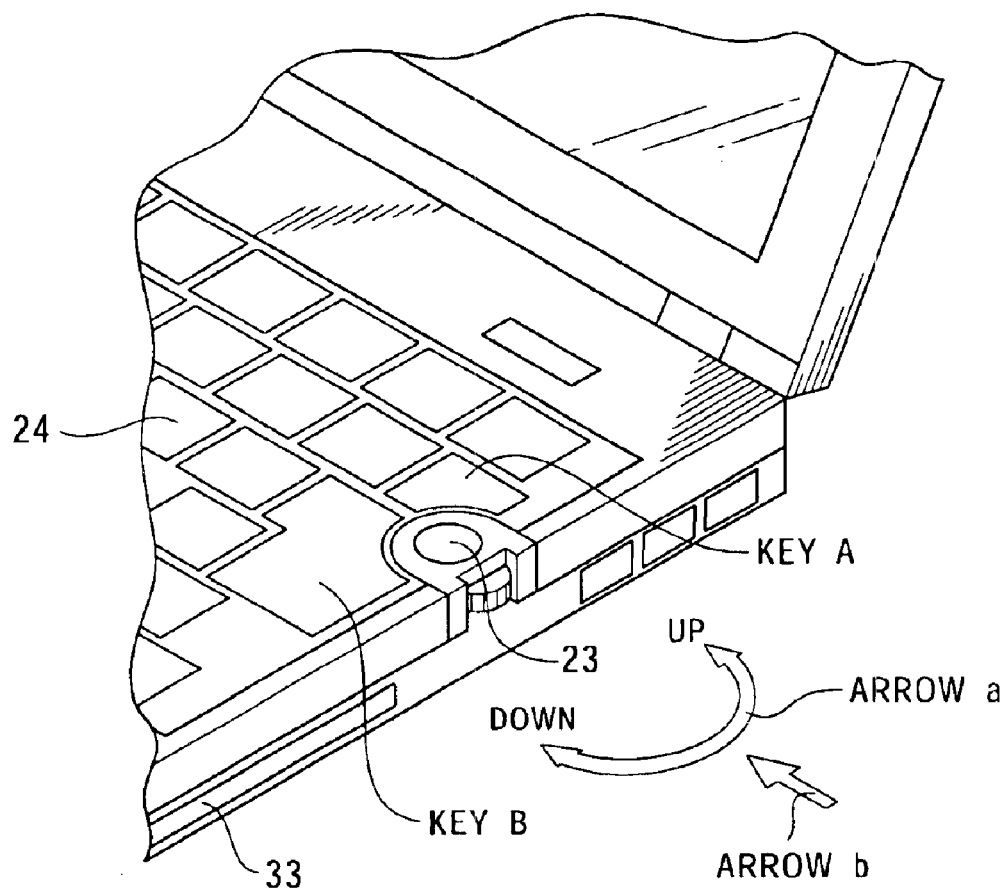
FIG. 3 is an enlarged view of the vicinity of a jog dial of the personal computer shown in FIG. 1.
Figure 4:
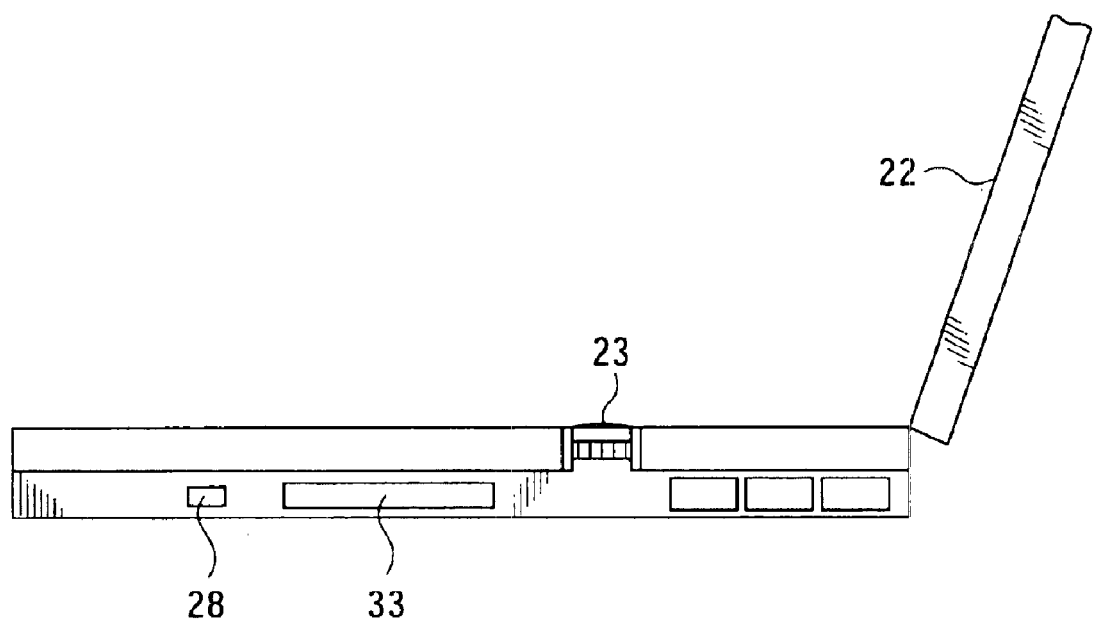
FIG. 4 is a right side view showing the configuration of a right side surface of the personal computer shown in FIG. 1.

The personal computer 1 is basically constructed of a main unit 21 and a display unit 22 that can be opened and closed with respect to the main unit 21. FIG. 1 is an external perspective view showing the display unit 22 opened with respect to the main unit 21. FIG. 2 is a top plan view of the main unit 21, and FIG. 3 is an enlarged view of a jog dial 23, which is provided in the main unit 21 and which will be discussed hereinafter. FIG. 4 is a side view of the jog dial 23 provided in the main unit 21.

The top face of the main unit 21 has a keyboard 24 operated to enter diverse characters, symbols, and the like, a touch pad 26 serving as a pointing device used to move a pointer or a mouse cursor displayed on an LCD 25, and a power switch 27. The jog dial 23, an Institute of Electrical and Electronics Engineers (IEEE) 1394 port 28, etc. are provided on the side face of the main unit 21. The touch pad 26 may be replaced by a stick type pointing device.

The display unit 22 has a liquid crystal display (LCD) 25 for displaying images that is provided on the front thereof, and a lamp assembly including a power lamp PL, a battery lamp BL, a message lamp ML (not shown) provided as necessary, and other lamps constructed of LEDs, the lamp assembly being located at top right thereof. At the upper central area of the display unit 22, an image sensor 30 having a CCD video camera 29 equipped with a solid-state image sensing device (CCD), and a microphone 31 are provided. At top right of the main unit 21 shown in FIG. 1, a shutter button 32 for operating the CCD video camera 29 is provided.

The image sensor 30 is rotatably fixed to the display unit 22. The image sensor 30 is, for example, rotated from a position that allows the CCD video camera 29 to photograph a user who is operating the personal computer 1 when the user operates the image sensor 30 by himself or herself to a position that allows the CCD video camera 29 to photograph an object in the same direction as that of the sight lines of the user operating the personal computer 1.

The jog dial 23 is installed, for example, between key A and key B disposed at right of the keyboard 24 on the main unit 21 shown in FIG. 2 such that the top surface thereof is substantially flush with key A and key B. The jog dial 23 carries out predetermined processing (e.g., scrolling a screen) when it is turned in the direction indicated by an arrow a and also carries out predetermined processing (e.g., confirming a selected icon) when it is turned in the direction indicated by an arrow b, as shown in FIG. 3.

The IEEE1394 port 28 has a structure that conforms to standard provided by IEEE1394, and a cable complying with the standard provided by the IEEE1394 is connected to the port 28.

Figure 5:
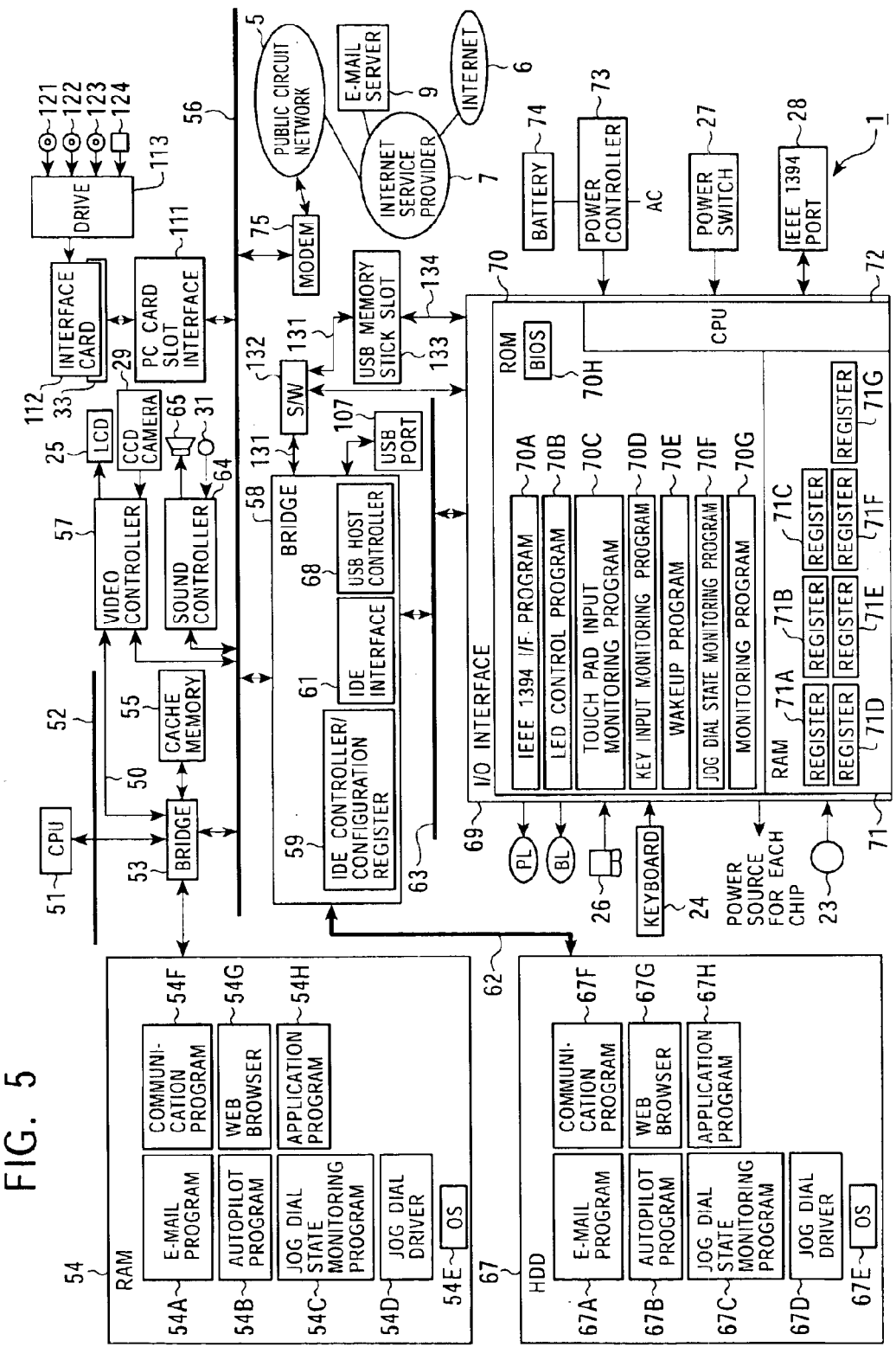
FIG. 5 is a block diagram showing a construction example of the interior of the personal computer shown in FIG. 1.

Referring now to FIG. 5, an example of an internal construction of the personal computer 1 will be explained.

A central processing unit (CPU) 51 is constructed of, for example, Intel's PENTIUM (registered trademark) processor or the like, and connected to a host bus 52. A bridge 53 ("North bridge"), which is also connected to the host bus 52, has an accelerated graphics port (AGP) 50 and is connected to a peripheral component interconnect/interface (PCI) bus 56.

The bridge 53 is formed of, for example, Intel's AGP host bridge controller 440BX or the like, and mainly controls the CPU 51 and a random access memory (RAM) 54, which is a "main memory." Moreover, the bridge 53 controls a video controller 57 through the intermediary of the AGP 50. The bridge 53 and a bridge ("South bridge," PCI-ISA bridge) 58 make up a chip set.

The bridge 53 is also connected to a cache memory 55. The cache memory 55 is formed of a static RAM (SRAM) or the like that permits higher writing or reading than the RAM 54 does, and caches or temporarily stores programs or data used by the CPU 51.

The CPU 51 has a cache therein that is capable of operating at a higher speed than the primary cache memory 55 and that is controlled by the CPU 51 itself.

The RAM 54 is formed of, for example, a dynamic RAM (DRAM) to store programs executed by the CPU 51 and data necessary for operating the CPU 51. To be more specific, the RAM 54 stores, for example, an electronic mail program 54A, an autopilot program 54B, a jog dial state monitoring program 54C, and a jog dial driver 54D loaded from an HDD 67 at predetermined timings, an operating program (OS) 54E, a communication program 54F, a web browser 54G, and other application programs 54H, including a power panel 201 and a driver 202, which will be discussed hereinafter.

The electronic mail program 54A is a program for transferring messages or electronic mail through the intermediary of a modem 75, a public circuit network 5, an Internet service provider 7, an electronic mail server 9, and the Internet 6.

The autopilot program 54B successively starts a plurality of preset processing or programs or the like in a preset sequence to implement them.

The jog dial state monitoring program 54C receives from the foregoing application programs notices indicating whether they are associated with the jog dial 23. If any of the application programs is associated with the jog dial 23, then the LCD 25 displays the task that can be performed by operating the jog dial 23.

The jog dial state monitoring program 54C also detects an event of the jog dial 23, and carries out processing associated with the detected event. The event refers to an operation in which the jog dial 23 is turned in the direction indicated by the arrow a shown in FIG. 3 or pressed in the direction indicated by the arrow b shown in FIG. 3. The jog dial driver 54D implements various functions when the jog dial 23 is operated.

The operating system (OS) 54E is a program for controlling basic operations of a computer, typically represented by, for example, WINDOWS (registered trademark) 95, WINDOWS (registered trademark) 98, WINDOWS (registered trademark) 2000, or WINDOWS (registered trademark) ME supplied by Microsoft Co., Ltd., or MACOS (registered trademark) supplied by Apple Computer, Inc.

The communication program 54F carries out processing for pier-to-pier communication, and controls the electronic mail program 54A to establish the communicational connection thereby to send electronic mail to which the IP address of the personal computer 1 has been attached to a communication party or to acquire the IP address from a predetermined electronic mail sent from the communication party.

The communication program 54F also controls the web browser 54G to perform communication based on the functions of the web browser 54G.

The web browser 54G implements the processing for reading data or causing the display unit 22 to display data on a predetermined web page under the control by the communication program 54F.

The application program 54H is constructed of various application programs and drivers, such as a power panel 201 and the drive 202, which will be discussed later. The processing of the power panel 201 and the driver 202 will be described hereinafter.

The video controller 57 connected to the bridge 53 through the intermediary of the AGP 50 receives data (image data or text data) supplied from the CPU 51 through the intermediary of AGP 50 and the bridge 53, generates the image data corresponding to the received data, and stores the generated image data or the received data as it is in a built-in video memory. The video controller 57 causes the LCD 25 of the display unit 22 to display images corresponding to the image data stored in the video memory.

The video controller 57 supplies the video data received from the CCD video camera 29 to the RAM 54 through the intermediary of the PCI bus 56.

A sound controller 64 is connected to the PCI bus 56. The sound controller 64 captures sound from the microphone 31, generates data corresponding to the sound, and outputs the generated data to the RAM 54. The sound controller 64 also drives a speaker 65 to cause the speaker 65 to output the sound.

A modem 75 is connected to the PCI bus 56. The modem 75 is connected to the public circuit network 5, and carries out communication processing through the public circuit network 5 or the Internet 6.

A PC card slot interface 111 is connected to the PCI bus 56 to supply the data received from an interface card 112 inserted in a slot 33 to the CPU 51 or the RAM 54, and also outputs the data received from the CPU 51 to the interface card 112. A drive 113 is connected to the PCI bus 56 through the intermediary of the PC card slot interface 111 and the interface card 112.

The drive 113 reads data recorded in an installed magnetic disc 121, an optical disc 122, a magneto-optical disc 123, or a semiconductor memory 124, and supplies the read data to the RAM 54 through the intermediary of the interface card 112, the PC card slot interface 111, and the PCI bus 56. Furthermore, the data generated by the processing carried out by the CPU 51 can be stored in the magnetic disc 121, the optical disc 122, the magneto-optical disk 123, or the semiconductor memory 124 that is mounted on the drive 113.

A bridge 58 ("South bridge") is also connected to the PCI bus 56. The bridge 58 is constructed of, for example, Intel's PIIX4E or the like, and primarily includes an integrated drive electronics (IDE) controller/configuration register 59, an IDE interface 61, and a USB host controller 68. The bridge 58 controls diverse types of inputs/outputs (I/O), such as a device connected to the IDE bus 62 or a device connected through the intermediary of an industry standard architecture/extended input output (ISA/EIO) bus 63 or an I/O interface 69.

A USB port 107 is connected to the USB host controller 68 of the bridge 58 so as to allow a variety types of USB devices to be connected thereto. Through a USB bus 131, a USB MEMORYSTICK slot 133 is provided in a board. The USB bus 131 is provided with a hardware bus switch (S/W) 132. The hardware bus switch 132 is turned ON/OFF in response to control signals supplied from an EC 130 so as to electrically connect or disconnect the USB bus 131.

If a USB device is connected to the USB port 107, the USB host controller 68 or electrically connected to a USB MEMORYSTICK slot 133 via the USB bus 131, that is, if the hardware bus switch 132 has been turned ON, then the USB host controller 68 decides that the USB device has been connected, and causes the CPU 51 to handle, for example, 3,000 to 4,000 interrupts per second. In this case, the CPU 51 cannot be changed to a low power consumption mode, e.g., the C3 status.

In this embodiment, it is assumed that the CPU 51 has the four operation modes, namely, C0, C1, C2, and C3. The present invention, however, is not limited to the number of operation modes or the number of interrupts corresponding to the individual operation modes, because these numbers depend upon each CPU and its peripheral systems.

In this embodiment, C0 indicates the full-speed operation, while C1 denotes the AutoHALT mode, C2 denotes the QuickStart mode, and C3 denotes the DeepSleep mode. In the following descriptions, it will be assumed that the power consumption is less in C2 than C1, and even less in C3 than C2. By changing the setting to these low power consumption modes, the life of a battery 74 can be prolonged. The mode selected from among C0 to C3 by the CPU 51 depends upon the condition of the processing carried out by the CPU 51. For instance, to change the mode to C3, the number of interrupts sent to the CPU 51 must be smaller than about 200 per second.

The hardware bus switch 132 is constructed of, for example, a printed circuit board (PCB) relay, a lead relay, a wet relay or other mechanical relay switch, or a semiconductor relay, such as a triac, a thyristor, a photo MOS relay, or a photo-coupler, or a semiconductor switch. The hardware bus switch 132 may be of an a contact (normally open) or a b contact (normally closed); however, the b contact is preferred, considering the operation in case of failure.

The IDE controller/configuration register 59 is primarily constructed of two IDE controllers, namely, a so-called primary IDE controller and secondary IDE controller, and a configuration register (none of these being shown).

The HDD 67 is connected to the primary IDE controller via the IDE bus 62. If an IDE device, such as a CD-ROM drive or HDD (not shown), is connected to another IDE bus, then the connected IDE device is electrically connected to the secondary IDE controller.

Recorded in the HDD 67 are an electronic mail program 67A, an autopilot program 67B, a jog dial state monitoring program 67C, a jog dial driver 67D, an OS 67E, a communication program 67F, a web browser 67G, and other application program 67H, etc.

The electronic mail program 67A through the application program 67H, etc. recorded in the HDD 67 are loaded into the RAM 54, as necessary.

The I/O interface 69 is also connected to the ISA/EIO bus 63. The I/O interface 69 is formed of an embedded controller (EC) 130, and includes a ROM 70, a RAM 71, and a CPU 72 that are interconnected therein.

The ROM 70 stores in advance an IEEE1394 interface program 70A, an LED control program 70B, a touch pad input monitoring program 70C, a key input monitoring program 70D, a wakeup program 70E, a jog dial state monitoring program 70F, a monitoring program 70G, etc. The CPU 72 executes the IEEE1394 interface program 70A through the monitoring program 70G.

The IEEE1394 interface program 70A transmits and receives data that conforms to the IEEE1394 standard (data stored in a packet) through the IEEE1394 port 28. The LED control program 70B controls the turning ON/OFF of the power lamp PL, the battery lamp BL, the message lamp ML provided as necessary, or other LED lamps. The touch pad input monitoring program 70C monitors the inputs through the touch pad 26 operated by a user.

The key input monitoring program 70D monitors inputs through the keyboard 24 or other key switches. The wakeup program 70E checks whether a predetermined time is reached on the basis of the data indicating the current time that is supplied from a timer circuit (not shown) of the bridge 58, and if the predetermined time is reached, then controls the power source of each chip constituting the personal computer 1 so as to start a predetermined processing or program or the like. The jog dial state monitoring program 70F constantly monitors whether a rotary encoder of the jog dial 23 has been rotated or whether the jog dial 23 has been pressed.

The monitoring program 70G monitors whether the potential of a predetermined pin (the pin number being denoted as n) among ten pins of the USB MEMORYSTICK slot 133 is high or low. The details of the processing carried out by the monitoring program 70G will be described hereinafter.

The MEMORYSTICK (trademark) can be inserted in the USB MEMORYSTICK slot 133. The MEMORYSTICK is a type of flash memory card developed by the assignee, Sony Corporation. The MEMORYSTICK is constructed of a flash memory device, which is a type of electrically erasable and programmable read only memory (EEPROM) housed in a small thin plastic case measuring 21.5×50×2.8 mm. The MEMORYSTICK is capable of writing and reading a variety of data, including images, sounds, and music through a ten-pin terminal. Among the ten pins of the USB MEMORYSTICK slot 133, an n-th pin is connected to the EC 130 via a signal line 134. The monitoring program 70G monitors whether the potential of the n-th pin of the USB MEMORYSTICK slot 133 is high or low on the basis of the potential of the signal line 134.

A basic input/output system (BIOS) 70H has been written to the ROM 70. The BIOS 70H controls the transfer or input/output of data between an OS or an application program and a peripheral device, such as the touch pad 26, the keyboard 24, or the HDD 67.

The RAM 71 has the registers for LED control, touch pad input status, key input status, or set time, an I/O register for monitoring a jog dial state, an IEEE1394 I/F register, a monitoring register, and the like as registers 71A through 71G. For instance, a predetermined value is stored in the LED control register when the jog dial 23 is pressed to start up the electronic mail program 54A, and the turning ON or OFF of the message lamp ML is controlled on the basis of the stored value. A predetermined operational key flag is stored in the key input status register when the jog dial 23 is pressed. A predetermined time is set in the set time register when a user operates the keyboard 24 or the like.

The jog dial 23, the touch pad 26, the keyboard 24, the IEEE1394 port 28, the shutter button 32, etc. are connected to the I/O interface 69 via a connector (not shown), and outputs the signals corresponding to the operations performed through the jog dial 23, the touch pad 26, the keyboard 24, or the shutter button 32 to the ISA/EIO bus 63. The I/O interface 69 also controls the transfer of data between itself and the devices connected through the IEEE1394 port 28. Further connected to the I/O interface 69 are the power lamp PL, the battery lamp BL, the message lamp ML, a power control circuit 73, and other lamps formed of LEDs.

The power control circuit 73 is connected to the built-in battery 74 or an AC power source to supply necessary power to blocks, and also carries out control for charging the built-in battery 74 or a second battery of a peripheral device. The I/O interface 69 monitors the power switch 27 operated when the power is turned ON or OFF.

Even if the power is OFF, the I/O interface 69 executes the IEEE1394 interface program 70A through the jog dial state monitoring program 70F by using an internal power source. In other words, the IEEE1394 interface program 70A through the jog dial state monitoring program 70F are always being executed.

Accordingly, even if the power switch 27 is OFF, and the CPU 51 is not running the OS 54E, the I/O interface 69 executes the jog dial state monitoring program 70F. Hence, if the jog dial 23 is pressed in a power saving mode or a power OFF mode, the personal computer 1 starts up predetermined software or a script file to carry out processing.

Thus, in the personal computer 1, the jog dial 23 has a programmable power key (PPK) function, obviating the need for a dedicated key.

Figure 6:
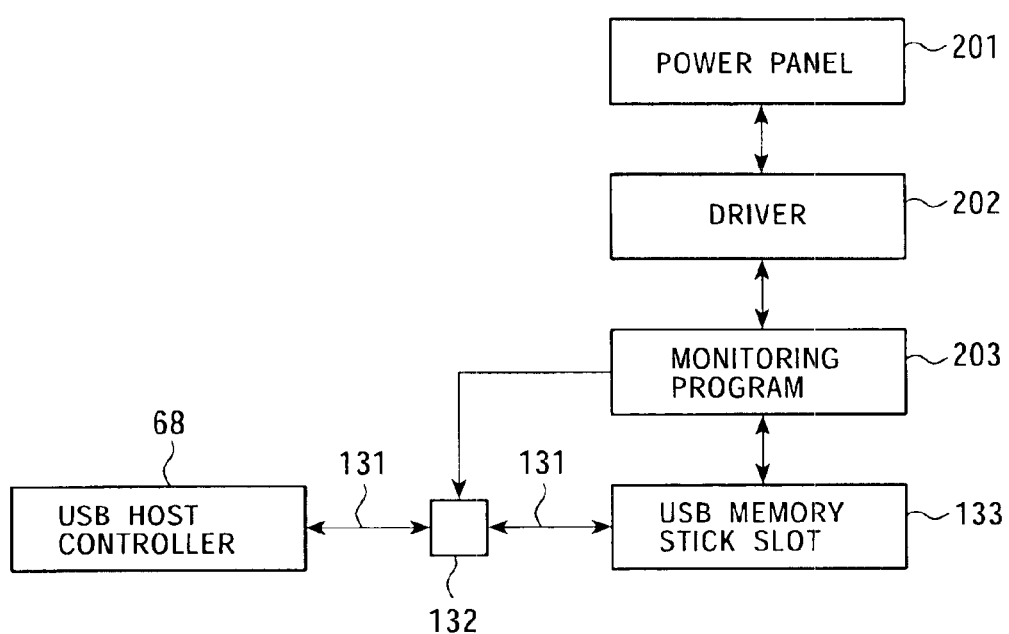
FIG. 6 is a functional block diagram illustrating a first embodiment in accordance with the present invention.

FIG. 6 is a functional block diagram showing a first embodiment for explaining the processing for detecting insertion or removal of the MEMORYSTICK.

A power panel 201 is application software on the OS 54E that controls the power source primarily on the basis of operational inputs by a user, or events or messages received from the monitoring program 203 via the driver 202.

The driver 202 allows communication between the power panel 201, which is the application software on the OS 54E, and the monitoring program 203, which is executed by the CPU 72 of the EC 130 and which will be discussed hereinafter.

The power panel 201 and the driver 202 are executed by the CPU 51.

The monitoring program 203, which corresponds to the monitoring program 70G explained in conjunction with FIG. 5, outputs whether the signal of the n-th pin received from the USB MEMORYSTICK slot 133 is high or low to the power panel 201 via the driver 202, and switches between an ON state and an OFF state of the hardware bus switch 132 in response to a control signal received from the power panel 201 via the driver 202. The monitoring program 203 is executed by the CPU 72 of the EC 130.

The USB host controller 68 sends about 3,000 to about 4,000 interrupts per second to the CPU 51 if it is electrically connected to any USB device. In this case, the CPU 51 cannot be changed to a low power consumption mode, e.g., the C3 status.

When the hardware bus switch 132 is turned ON, the USB host controller 68 and the USB MEMORYSTICK slot 133 are electrically connected via the USB bus 131. This means that, the USB host controller 68 detects the USB MEMORYSTICK slot 133 as a USB device, so that the CPU 51 receives an interrupt even if no other USB device has been connected.

When the hardware bus switch 132 is turned OFF, the USB host controller 68 and the USB MEMORYSTICK slot 133 are electrically disconnected via the USB bus 131. This means that, the USB host controller 68 does not detect the USB MEMORYSTICK slot 133 as a USB device, so that the CPU 51 receives no interrupt if no other USB device is connected.

Referring now to the flowchart of FIG. 7, processing 1 for detecting the insertion of the MEMORYSTICK will be described.

In an initial state, the monitoring program 203 detects the absence of the MEMORYSTICK in the MEMORYSTICK slot 133, and therefore conducts control so that the hardware bus switch 132 is OFF.

In step S1, the monitoring program 203 determines whether a change in the potential of the n-th pin of the MEMORYSTICK slot 133 has been detected, that is, whether a potential changeover from high to low has been detected. In this case, it will be assumed that the potential of the n-th pin is high when no MEMORYSTICK is inserted, while the potential of the n-th pin is low when the MEMORYSTICK is inserted. However, the logic of the n-th pin regarding the presence/absence of the MEMORYSTICK may be reversed. If it is determined in step S1 that no change in the potential of the n-th pin has been detected, then the processing of step S1 is repeated until it is determined that a change in the potential of the n-th pin has been detected.

If it is determined that a change in the potential of the n-th pin has been detected in step S1, then the monitoring program 203 detects that the MEMORYSTICK has been inserted in the MEMORYSTICK slot 133 in step S2.

In step S3, the monitoring program 203 notifies, via the driver 202, the power panel 201 of the MEMORYSTICK insertion event.

In step 54, the power panel 201 notifies, via the driver 202, the monitoring program 203 of the event of command for turning the hardware bus switch 1320N.

In step S5, the monitoring program 203 receives, via the driver 202, the event of command for turning the hardware bus switch 132 ON from the power panel 201.

In step S6, the monitoring program 203 outputs a control signal for turning the hardware bus switch 1320N to the hardware bus switch 132.

In step S7, the hardware bus switch 132 changes from the OFF state to the ON state in response to the control signal output by the monitoring program 203 so as to electrically connect the USB bus 131.

In step S7, the electrical connection of the USB bus 131 causes the USB host controller 68 and the MEMORYSTICK slot 133 to be electrically connected. Hence, in step S8, the USB host controller 68 detects the presence of the MEMORYSTICK slot 133, and terminates the processing.

The USB host controller 68 detects that it is not electrically connected with the MEMORYSTICK slot 133, i.e., it detects the absence of the MEMORYSTICK slot 133, in a state wherein the MEMORYSTICK is not in the MEMORYSTICK slot 133. Hence, if no other USB device has been connected, the CPU 51 can be switched to a low power consumption mode since no interrupts occurs in the CPU 51, whereas the interrupts would take place if the MEMORYSTICK slot 133 were connected.

Figure 7:
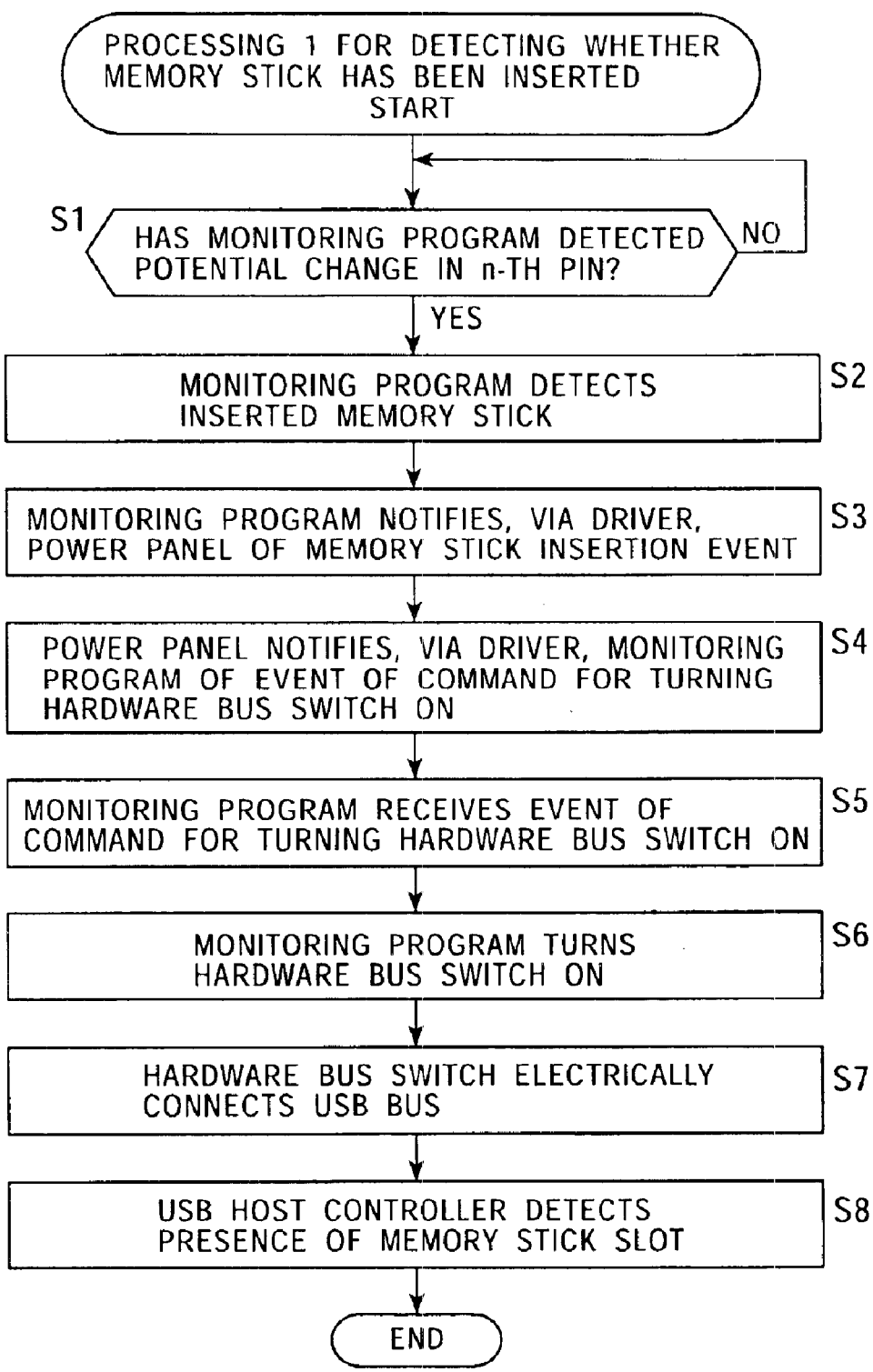
FIG. 7 is a flowchart for explaining processing 1 for detecting the insertion of a MEMORYSTICK.

If the MEMORYSTICK is inserted in the MEMORYSTICK slot 133 by the processing explained in conjunction with FIG. 7, then the hardware bus switch 132 is switched from the OFF state to the ON state by the processing of the monitoring program 203, thus causing the USB host controller 68 to detect the presence of the MEMORYSTICK slot 133. This enables the USB host controller 68 to detect the presence of the MEMORYSTICK slot 133 only if the MEMORYSTICK is in the MEMORYSTICK slot 133 even when the MEMORYSTICK slot 133 has been mounted on a board. With this arrangement, the USB host controller 68 does not have to send any wasteful interrupts to the CPU 51, permitting the CPU 51 to shift to a low power consumption mode. Thus, power consumption can be controlled, so that the time of drive on the battery 74, for example, can be prolonged.

Referring now to the flowchart of FIG. 8, processing 1 for detecting the removal of the MEMORYSTICK will be explained.

In an initial state, the monitoring program 203 detects the presence of the MEMORYSTICK in the MEMORYSTICK slot 133, and therefore conducts control so that the hardware bus switch 132 is ON.

In step S21, the monitoring program 203 determines whether a change in the potential of the n-th pin of the MEMORYSTICK slot 133 has been detected, that is, whether a potential changeover from high to low has been detected. In this case, it will be assumed that the potential of the n-th pin is high when no MEMORYSTICK has been inserted, while the potential of the n-th pin is low when the MEMORYSTICK has been inserted. However, the logic of the n-th pin regarding the presence/absence of the MEMORYSTICK may be reversed. If it is determined in step S21 that no change in the potential of the n-th pin has been detected, then the processing of step S21 is repeated until it is determined that a change in the potential of the n-th pin has been detected.

If it is determined in step S21 that a change in the potential of the n-th pin has been detected, then the monitoring program 203 detects in step S22 that the MEMORYSTICK has been removed from the MEMORYSTICK slot 133.

In step S23, the monitoring program 203 notifies, via the driver 202, the power panel 201 of the MEMORYSTICK removal event.

In step S24, the power panel 201 notifies, via the driver 202, the monitoring program 203 of the event of command for turning the hardware bus switch 132 OFF.

In step S25, the monitoring program 203 receives, via the driver 202, the event of command for turning the hardware bus switch 132 OFF from the power panel 201.

In step S26, the monitoring program 203 outputs a control signal for turning the hardware bus switch 132 OFF to the hardware bus switch 132.

In step S27, the hardware bus switch 132 changes from the ON state to the OFF state in response to the control signal output by the monitoring program 203 so as to electrically disconnect the USB bus 131.

In step S27, the electrical disconnection of the USB bus 131 causes the USB host controller 68 and the MEMORYSTICK slot 133 to be electrically disconnected. Hence, in step S28, the USB host controller 68 detects the absence of the MEMORYSTICK slot 133, and terminates the processing.

The USB host controller 68 is electrically connected with the MEMORYSTICK slot 133 and detects the presence of the MEMORYSTICK slot 133 in a state wherein the MEMORYSTICK is in the MEMORYSTICK slot 133. Hence, even if no other USB device has been connected, the USB host controller 68 sends interrupts to the CPU 51 because of the connected MEMORYSTICK slot 133, thus preventing the CPU 51 from shifting to a low power consumption mode.

Figure 8:
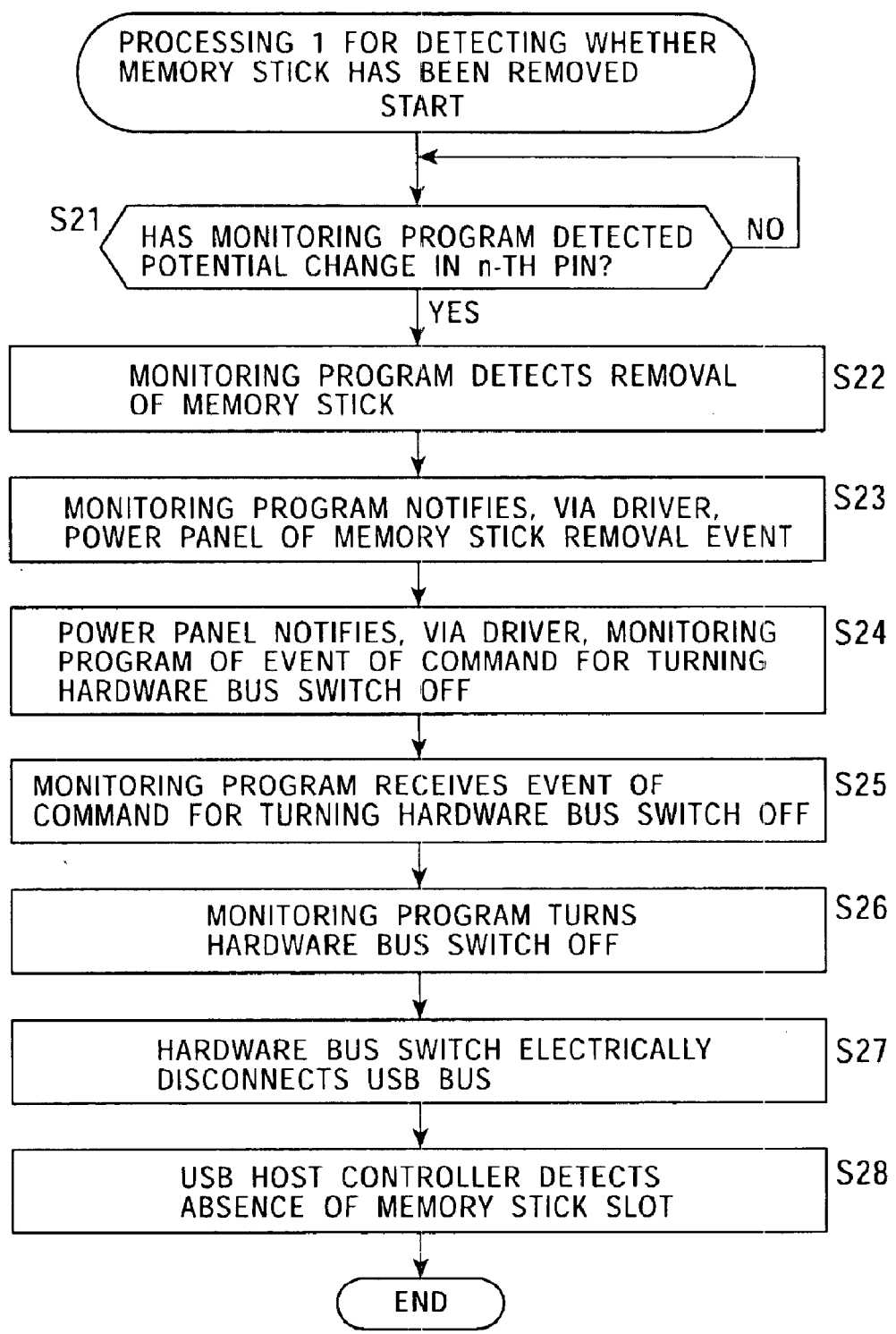
FIG. 8 is a flowchart for explaining processing 1 for detecting the removal of a MEMORYSTICK.

If the MEMORYSTICK is removed from the MEMORYSTICK slot 133 by the processing explained in conjunction with FIG. 8, then the hardware bus switch 132 is switched from the ON state to the OFF state by the processing of the monitoring program 203, thus causing the USB host controller 68 to detect the absence of the MEMORYSTICK slot 133. This enables the USB host controller 68 to detect the absence of the MEMORYSTICK slot 133 if the MEMORYSTICK has been removed from the MEMORYSTICK slot 133 even when the MEMORYSTICK slot 133 has been mounted on a board.

With this arrangement, if no other USB device is connected to the USB host controller 68, the USB host controller 68 does not have to cause the CPU 51 to handle any wasteful interrupts, thus permitting the CPU 51 to shift to a low power consumption mode. Thus, power consumption can be controlled, so that the time of drive on the battery 74, for example, can be prolonged.

To implement the processing explained in conjunction with FIGS. 7 and 8, the turning ON/OFF of the hardware bus switch 132 is controlled on the basis of the result of the detection of insertion or removal of the MEMORYSTICK by the monitoring program 203. This means that a certain time is required before the transfer of information between the MEMORYSTICK and the USB host controller 68 is started from the moment the MEMORYSTICK is inserted in the MEMORYSTICK slot 133. Hence, carrying out the processing described in conjunction with FIGS. 7 and 8 takes more response time than in the case where the MEMORYSTICK slot 133 is in constant connection.

Therefore, an arrangement is made so that a user who prefers to give priority to a quicker response time than power consumption can change the setting to a mode in which the MEMORYSTICK slot 133 is in constant connection, i.e., the hardware bus switch 132 is always ON.

Referring now to the flowchart of FIG. 9, the descriptions will be given of processing 1 for changing the setting from the normal monitoring mode in which the processing described in conjunction with FIGS. 7 and 8 is carried out to a hardware bus switch in constant connection mode.

The user refers to, for example, the setting screen displayed on the LCD 25 to enter an instruction for changing the mode. The power panel 201 receives in step S41 a signal indicating the operational input by the user, and determines in step S42 whether the operational input for changing the setting from the normal monitoring mode to the hardware bus switch in constant connection mode has been received. If the power panel 201 determines in step S42 that the operational input for changing the setting from the normal monitoring mode to the hardware bus switch in constant connection mode has not been received, then the processing of step S42 is repeated until the power panel 201 determines that the operational input for changing the mode has been received.

If it is determined in step S42 that the operational input for changing the setting from the normal monitoring mode to the hardware bus switch in constant connection mode has been received, then the power panel 201 notifies in step S43 the monitoring program 203 of the event of a command for maintaining the hardware bus switch 132 constantly in the ON state (changing the mode to the hardware bus switch in constant connection mode) through the intermediary of the driver 202.

In step S44, the monitoring program 203 receives, through the intermediary of the driver 202, the event of the command for maintaining the hardware bus switch 132 always ON, and detects the status of the hardware bus switch 132.

In step S45, the monitoring program 203 determines whether the hardware bus switch 132 is ON.

If it is determined in step S45 that the hardware bus switch 132 is not ON, then the monitoring program 203 outputs the control signal for turning the hardware bus switch 1320N to the hardware bus switch 132 in step S46.

In step S47, the hardware bus switch 132 changes its OFF state to the ON state in response to the control signal issued by the monitoring program 203 so as to electrically connect the USB bus 131.

The electrical connection to the USB bus 131 performed in step S47 causes the USB host controller 68 and the MEMORYSTICK slot 133 to be electrically connected. In step S48, therefore, the USB host controller 68 detects the presence of the MEMORYSTICK slot 133 and terminates the processing.

In step S45, if it is determined that the hardware bus switch 132 is ON, then it is unnecessary to change the state because the USB host controller 68 has detected the presence of the MEMORYSTICK slot 133. Hence, if it is determined in step S45 that the hardware bus switch 132 is ON, then the processing is terminated.

Figure 9:
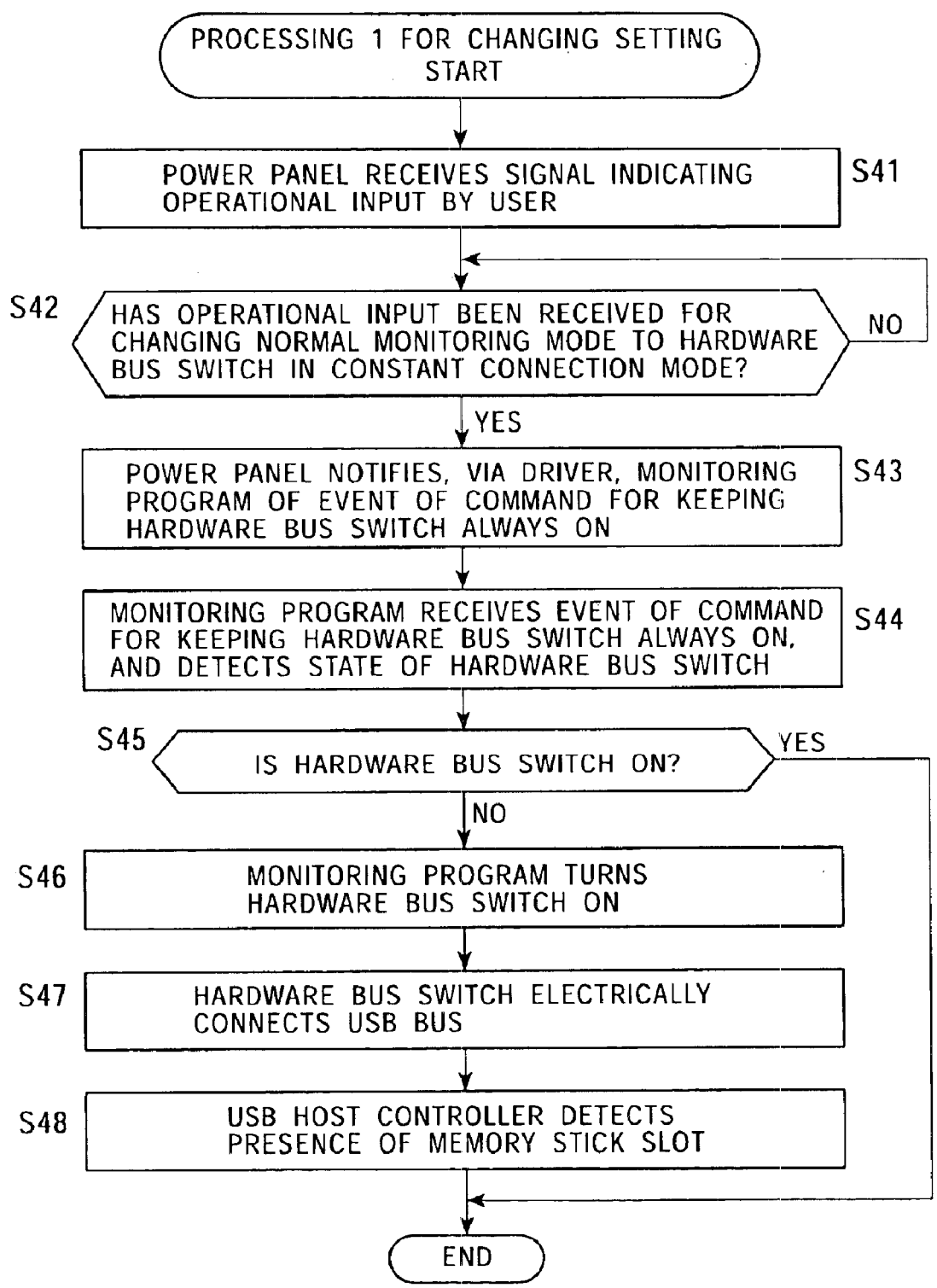
FIG. 9 is a flowchart for explaining processing 1 for changing a setting.

By the processing described in conjunction with FIG. 9, the hardware bus switch 132 is fixed to the ON state by the monitoring program 203 and the setting is changed to the hardware bus switch in constant connection mode regardless of whether the USB host controller 68 is currently detecting the presence of the MEMORYSTICK slot 133 or the absence of the MEMORYSTICK slot 133.

Referring now to the flowchart of FIG. 10, the processing for detecting the insertion/removal of the MEMORYSTICK in the hardware bus switch in constant connection mode will be explained.

Figure 10:
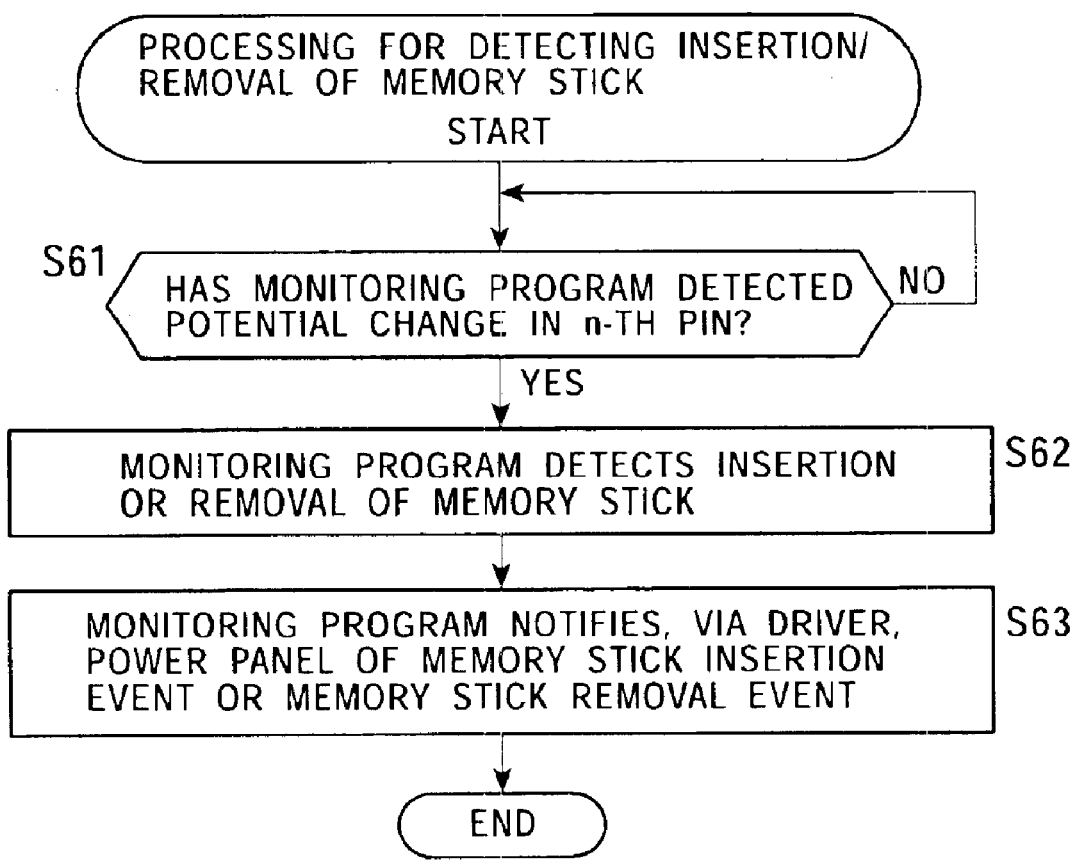
FIG. 10 is a flowchart for explaining the processing for detecting the insertion/removal of the MEMORYSTICK.

In the initial state of the processing shown in FIG. 10, the hardware bus switch 132 is fixed to the ON state regardless of whether the MEMORYSTICK is present or absent.

In step S61, the monitoring program 203 determines whether a change in the potential of the n-th pin of the MEMORYSTICK slot 133 has been detected. If it is determined in step S61 that no change in the potential of the n-th pin has been detected, then the processing of step S61 is repeated until it is determined that a change in the potential of the n-th pin has been detected.

If it is determined in step S61 that a change in the potential of the n-th pin has been detected, then the monitoring program 203 detects, in step S62, the insertion of the MEMORYSTICK in the MEMORYSTICK slot 133 or the removal of the MEMORYSTICK from the MEMORYSTICK slot 133 on the basis of a change in the potential of the n-th pin.

In step S63, the monitoring program 203 notifies, via the driver 202, the power panel 201 of the event of the insertion of the MEMORYSTICK or the event of the removal of the MEMORYSTICK, and terminates the processing.

If the set mode is the hardware bus switch in constant connection mode, then the insertion or removal of the MEMORYSTICK is detected by the processing explained in conjunction with FIG. 10, and the detection result is informed to the power panel 201. In this case, the response time is shorter than in the case where the processing explained in conjunction with FIGS. 7 and 8 is carried out.

Referring now to the flowcharts of FIGS. 11 and 12, processing 2 for changing the setting from the hardware bus switch in constant connection mode to the normal monitoring mode will be described.

A user refers, for example, to the setting screen displayed on the LCD 25 to enter an instruction for changing the mode. The power panel 201 receives in step S71 a signal indicating the operational input by the user, and determines in step S72 whether the operational input for changing the setting from the hardware bus switch in constant connection mode to the normal monitoring mode has been received. If the power panel 201 determines in step S72 that the operational input for changing the setting from the hardware bus switch in constant connection mode to the normal monitoring mode has not been received, then the processing of step S72 is repeated until the power panel 201 determines that the operational input for changing the mode has been received.

If it is determined in step S72 that the operational input for changing the setting from the hardware bus switch in constant connection mode to the normal monitoring mode has been received, then the power panel 201 notifies, in step S73, the monitoring program 203 of the event of changing the setting to the normal monitoring mode through the intermediary of the driver 202.

In step S74, the power panel 201 notifies, via the driver 202, the monitoring program 203 of the event of inquiring whether the MEMORYSTICK has been inserted in the MEMORYSTICK slot 133.

In step S75, the monitoring program 203 receives the inquiry event via the driver 202, and detects whether the potential of the n-th pin is high or low.

In step S76, the monitoring program 203 determines whether the MEMORYSTICK has been inserted on the basis of the potential of the n-th pin that has been detected in step S75.

If it is determined in step S76 that the MEMORYSTICK has not been inserted, then the monitoring program 203 returns a "no MEMORYSTICK" status to the power panel 201 through the intermediary of the driver 202 in step S77.

In step S78, the power panel 201 notifies the monitoring program 203 of the event of a command for turning the turning the hardware bus switch 132 OFF.

In step S79, the monitoring program 203 receives the event of the command for turning the hardware bus switch 132 OFF, generates a control signal for turning the hardware bus switch 132 OFF, and outputs the generated control signal to the hardware bus switch 132.

In step S80, the hardware bus switch 132 changes its ON state to the OFF state in response to the control signal issued by the monitoring program 203 so as to electrically disconnect the USB bus 131.

The electrical disconnection of the USB bus 131 in step S80 causes the USB host controller 68 and the MEMORYSTICK slot 133 to be electrically disconnected. Hence, in step S81, the USB host controller 68 detects the absence of the MEMORYSTICK slot 133, and terminates the processing.

If it is determined in step S76 that the MEMORYSTICK has been inserted, then the monitoring program 203 returns a "MEMORYSTICK inserted" status to the power panel 201 through the intermediary of the driver 202 and terminates the processing in step S82.

Figure 11:
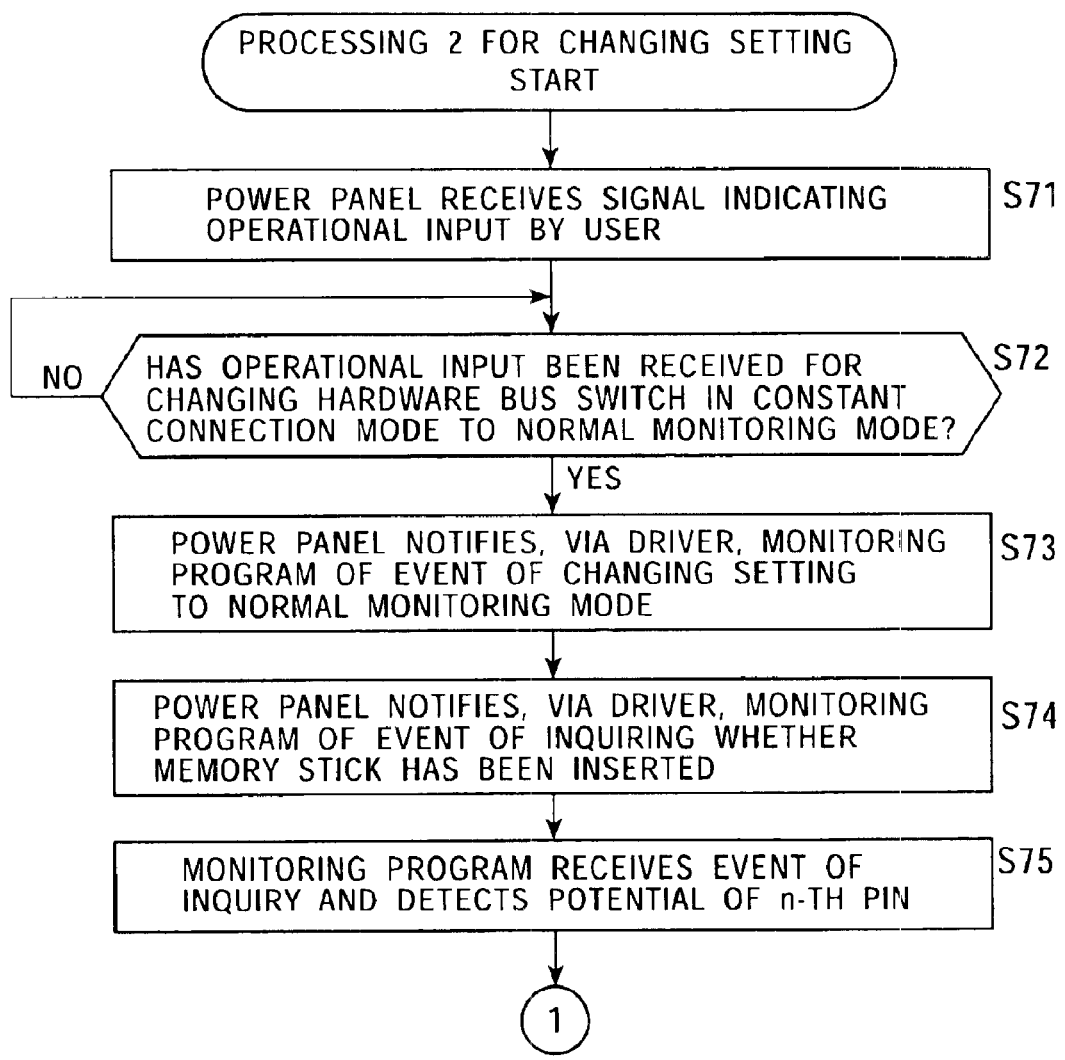
FIG. 11 is a flowchart for explaining processing 2 for changing a setting.
Figure 12:
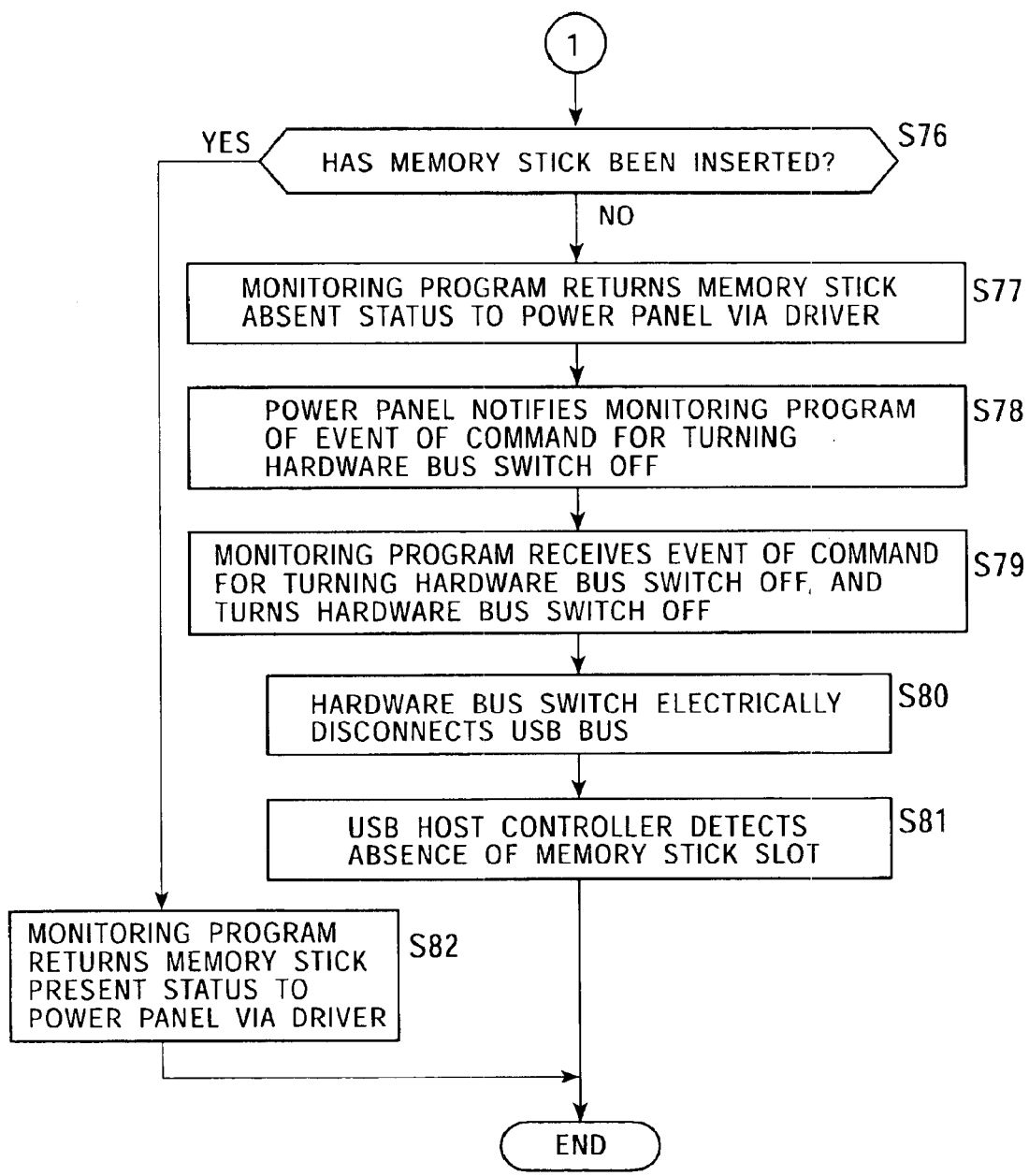
FIG. 12 is another flowchart for explaining processing 2 for changing the setting.

By the processing described in conjunction with FIGS. 11 and 12, the monitoring program 203 detects whether the MEMORYSTICK has been inserted in the MEMORYSTICK slot 133, and turning ON or OFF of the hardware bus switch 132 is decided on the basis of the detection result. Then, the setting is changed from the hardware bus switch in constant connection mode to the normal monitoring mode.

Figure 13:
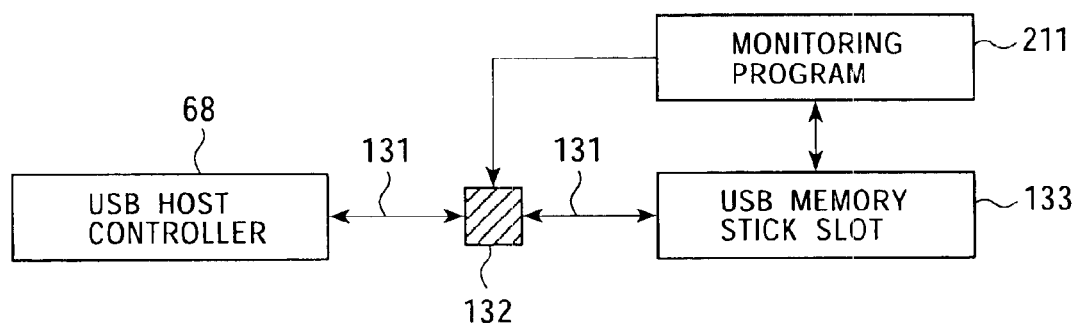
FIG. 13 is a functional block diagram for explaining a second embodiment in accordance with the present invention.

FIG. 13 is a functional block diagram showing a second embodiment for explaining the processing for detecting the insertion or removal of the MEMORYSTICK. The like components as those shown in FIG. 6 will be assigned the like reference numerals, and the descriptions thereof will be omitted, as necessary.

Unlike the first embodiment in which the power panel 201 exchanges information with a program executed in the CPU 51, the second embodiment shown in functional block diagram of FIG. 13 is designed to allow a monitoring program 211 to determine whether the MEMORYSTICK is in the MEMORYSTICK slot 133 without performing the information exchange mentioned above and to control turning ON/OFF of the hardware bus switch 132. This means that, in the second embodiment, the processing carried out by the power panel 201 and the monitoring program 203 explained in the first embodiment is performed by the monitoring program 211 alone.

Referring now to the flowchart of FIG. 14, processing 2 for detecting the insertion of the MEMORYSTICK will be described.

In an initial state, the monitoring program 211 detects the absence of the MEMORYSTICK in the MEMORYSTICK slot 133, and therefore conducts control so that the hardware bus switch 132 is in the OFF state.

In step S91, the monitoring program 211 determines whether a change in the potential of the n-th pin of the MEMORYSTICK slot 133 (the change in the potential from high to low) has been detected. In this embodiment, it will be assumed that the potential of the n-th pin is high when no MEMORYSTICK has been inserted, while the potential of the n-th pin is low when the MEMORYSTICK has been inserted. However, the logic of the n-th pin regarding the presence/absence of the MEMORYSTICK may be reversed. If it is determined in step S91 that no change in the potential of the n-th pin has been detected, then the processing of step S91 is repeated until it is determined that a change in the potential of the n-th pin has been detected.

If it is determined in step S91 that a change in the potential of the n-th pin has been detected, then the monitoring program 211 detects in step S92 that the MEMORYSTICK has been inserted in the MEMORYSTICK slot 133.

In step S93, the monitoring program 211 outputs a control signal for turning the hardware bus switch 1320N to the hardware bus switch 132.

In step S94, the hardware bus switch 132 changes from the OFF state to the ON state in response to the control signal output by the monitoring program 211 so as to electrically connect the USB bus 131.

In step S94, the electrical connection of the USB bus 131 causes the USB host controller 68 and the MEMORYSTICK slot 133 to be electrically connected. Hence, in step S95, the USB host controller 68 detects the presence of the MEMORYSTICK slot 133, and terminates the processing.

In a state wherein the MEMORYSTICK is not in the MEMORYSTICK slot 133, the USB host controller 68 detects no electrical connection with the MEMORYSTICK slot 133, i.e., the absence of the MEMORYSTICK slot 133. In other words, the interrupts sent to the CPU 51, which take place in the presence of the MEMORYSTICK slot 133, will not occur, thus allowing the CPU 51 to shift to a low power consumption mode.

Figure 14:
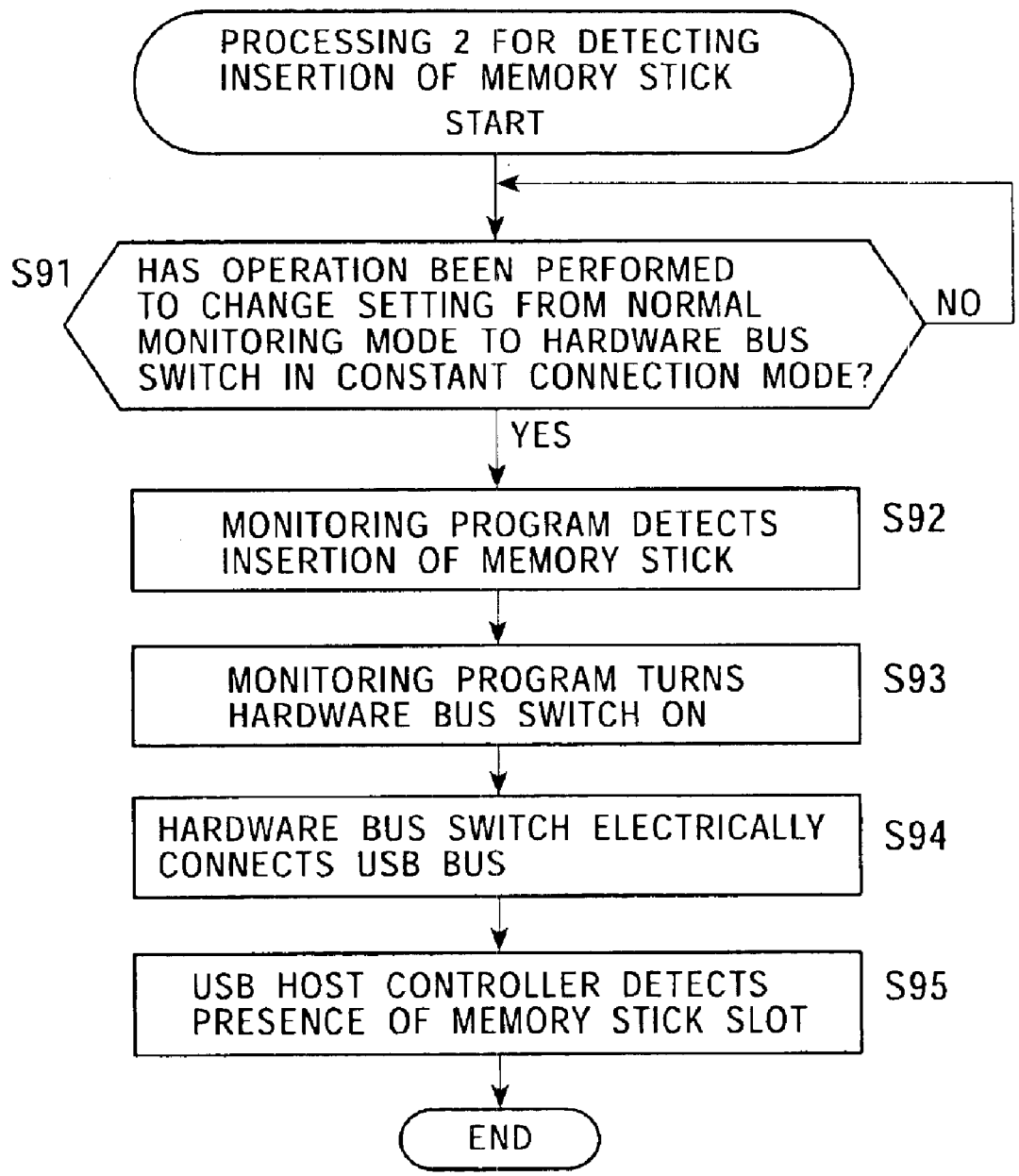
FIG. 14 is a flowchart for explaining processing 2 for detecting the insertion of the MEMORYSTICK.

If the MEMORYSTICK is inserted in the MEMORYSTICK slot 133 by the processing explained in conjunction with FIG. 14 in the same manner as explained in conjunction with FIG. 7, then the hardware bus switch 132 is switched from the OFF state to the ON state by the processing of the monitoring program 211, thus causing the USB host controller 68 to detect the presence of the MEMORYSTICK slot 133.

Thus, as in the case explained with reference to FIG. 7, the USB host controller 68 is capable of detecting the presence of the MEMORYSTICK slot 133 only if the MEMORYSTICK has been inserted in the MEMORYSTICK slot 133 even when the MEMORYSTICK slot 133 is mounted on a board. Therefore, if the MEMORYSTICK is not in the MEMORYSTICK slot 133 and if no other USB device is connected to the USB host controller 68, then the USB host controller 68 does not have to send wasteful interrupt requests to the CPU 51. This enables the CPU 51 to shift to a low power consumption mode to restrain power consumption, so that the time of drive on a battery 74, for example, can be extended.

Referring now to the flowchart of FIG. 15, processing 2 for detecting the removal of the MEMORYSTICK will be explained.

In an initial state, the monitoring program 211 detects the presence of the MEMORYSTICK in the MEMORYSTICK slot 133, and therefore conducts control so that the hardware bus switch 132 is in the ON state.

In step S101, the monitoring program 211 determines whether a change in the potential of the n-th pin of the MEMORYSTICK slot 133 (the change in the potential from low to high) has been detected. In this embodiment, it will be assumed that the potential of the n-th pin is high when no MEMORYSTICK has been inserted, while the potential of the n-th pin is low when the MEMORYSTICK has been inserted. However, the logic of the n-th pin regarding the presence/absence of the MEMORYSTICK may be reversed. If it is determined in step S101 that no change in the potential of the n-th pin has been detected, then the processing of step S101 is repeated until it is determined that a change in the potential of the n-th pin has been detected.

If it is determined in step S101 that a change in the potential of the n-th pin has been detected, then the monitoring program 211 detects in step S102 that the MEMORYSTICK has been removed from the MEMORYSTICK slot 133.

In step S103, the monitoring program 211 outputs a control signal for turning the hardware bus switch 132 OFF to the hardware bus switch 132.

In step S104, the hardware bus switch 132 changes from the ON state to the OFF state in response to the control signal output by the monitoring program 211 so as to electrically disconnect the USB bus 131.

In step S104, the electrical disconnection of the USB bus 131 causes the USB host controller 68 and the MEMORYSTICK slot 133 to be electrically disconnected. Hence, in step S105, the USB host controller 68 detects the absence of the MEMORYSTICK slot 133, and terminates the processing.

In a state wherein the MEMORYSTICK is in the MEMORYSTICK slot 133, the USB host controller 68 is in the electrical connection with the MEMORYSTICK slot 133 and detects the presence of the MEMORYSTICK slot 133. In other words, the USB host controller 68 sends the interrupts to the CPU 51, which take place when the MEMORYSTICK slot 133 is in connection, thus preventing the CPU 51 from shifting to a low power consumption mode.

Figure 15:
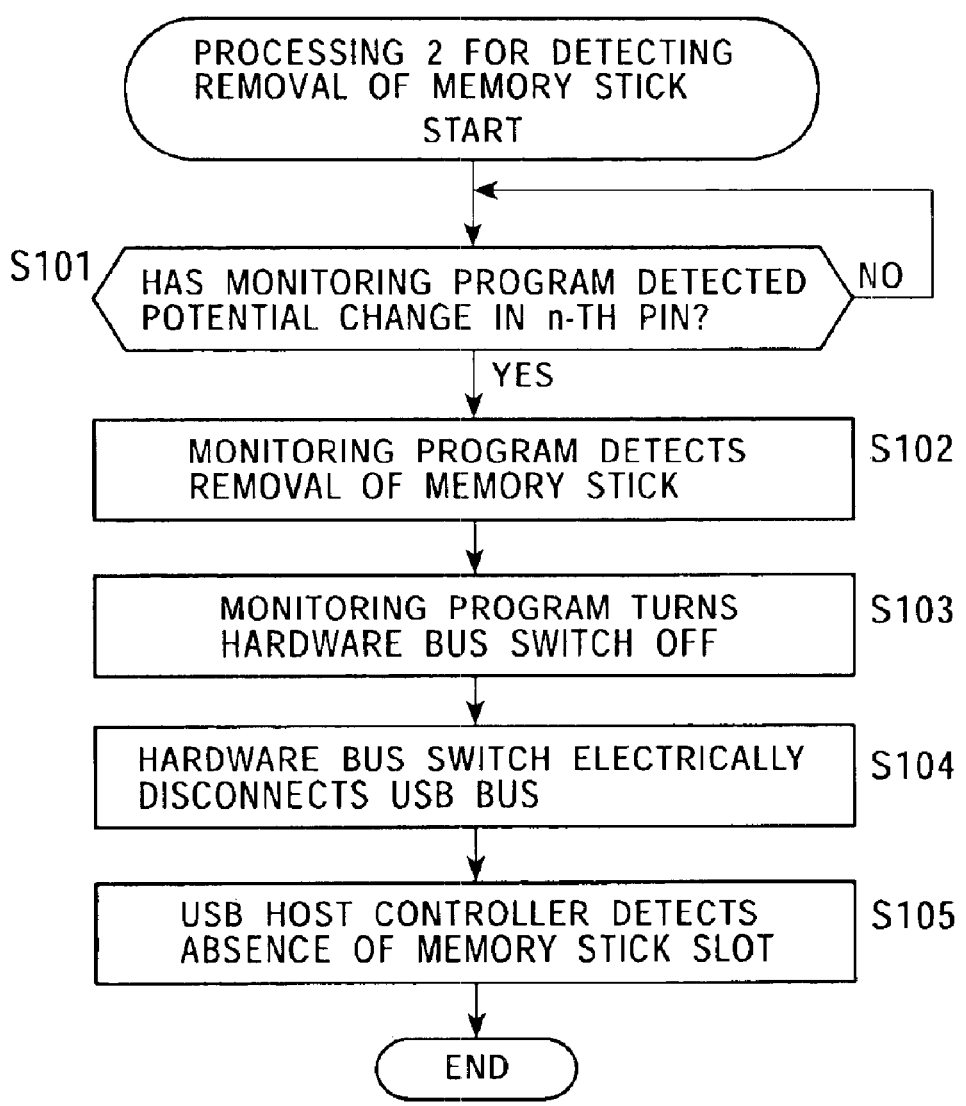
FIG. 15 is a flowchart for explaining processing 2 for detecting the removal of the MEMORYSTICK.

If the MEMORYSTICK is removed from the MEMORYSTICK slot 133 by the processing explained in conjunction with FIG. 15 in the same manner as explained in conjunction with FIG. 8, then the hardware bus switch 132 is switched from the ON state to the OFF state by the processing of the monitoring program 211, thus causing the USB host controller 68 to detect the absence of the MEMORYSTICK slot 133. Thus, the USB host controller 68 is capable of detecting the absence of the MEMORYSTICK slot 133 if the MEMORYSTICK is removed from the MEMORYSTICK slot 133 even when the MEMORYSTICK slot 133 is mounted on a board. Therefore, if the MEMORYSTICK is not in the MEMORYSTICK slot 133 and if no other USB device is connected to the USB host controller 68, then the USB host controller 68 does not have to send wasteful interrupt requests to the CPU 51. This enables the CPU 51 to shift to a low power consumption mode to restrain power consumption, so that the time of drive on a battery 74, for example, can be extended.

To implement the processing explained in conjunction with FIGS. 14 and 15, the turning ON/OFF of the hardware bus switch 132 is controlled on the basis of the result of the detection of insertion or removal of the MEMORYSTICK by the monitoring program 211. This means that a certain time is required before the transfer of information between the MEMORYSTICK and the USB host controller 68 is started from the moment the MEMORYSTICK is inserted in the MEMORYSTICK slot 133. A user who wishes to prioritize quicker response than power consumption can change the setting to the mode in which the MEMORYSTICK slot 133 is always in connection, i.e., the mode in which the hardware bus switch 132 is always ON.

Figure 16:
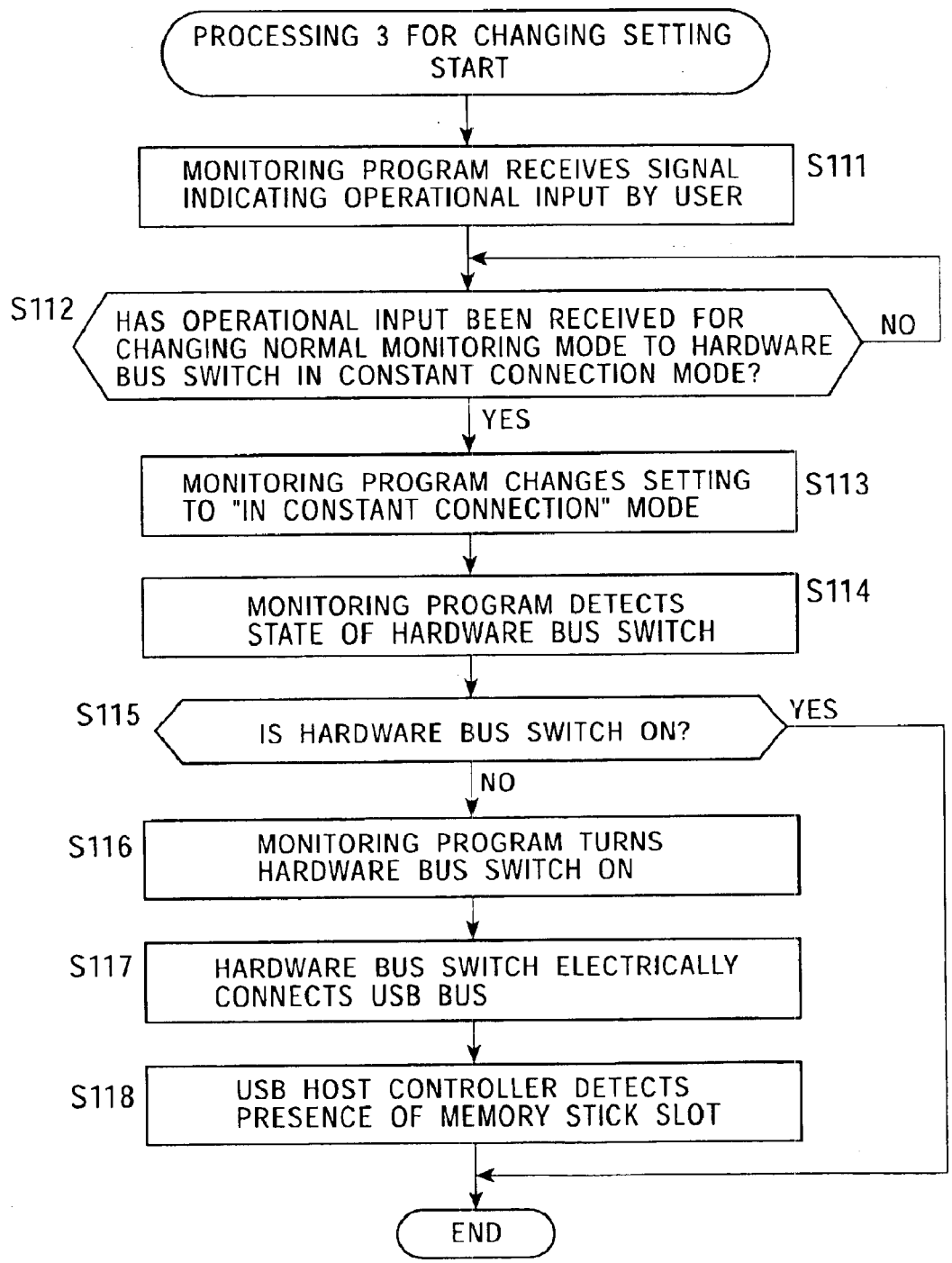
FIG. 16 is a flowchart for explaining processing 3 for changing a setting.

Referring now to the flowchart of FIG. 16, processing 3 for changing the setting from the normal monitoring mode, in which the processing explained with reference to FIGS. 14 and 15 is carried out, to the hardware bus switch in constant connection mode will be explained.

A user refers, for example, to the setting screen displayed on the LCD 25 to enter an instruction for changing the mode. The monitoring program 211 receives in step S111 a signal indicating the operational input by the user, and determines in step S112 whether the operational input for changing the setting from the normal monitoring mode to the hardware bus switch in constant connection mode has been received. If the monitoring program 211 determines in step S112 that the operational input for changing the setting from the normal monitoring mode to the hardware bus switch in constant connection mode has not been received, then the processing of step S112 is repeated until it is determined that the operational input for changing the mode has been received.

If it is determined in step S112 that the operational input for changing the setting from the normal monitoring mode to the hardware bus switch in constant connection mode has been received, then the monitoring program 211 changes the setting to the constant connection mode in step S113.

In step S114, the monitoring program 211 detects the state of the hardware bus switch 132.

In step S115, the monitoring program 211 determines whether the hardware bus switch 132 is ON.

If it is determined in step S115 that the hardware bus switch 132 is not ON, then the monitoring program 211 issues, in step S116, a control signal for turning the hardware bus switch 132 ON to the hardware bus switch 132.

In step S117, the hardware bus switch 132 changes its OFF state to the ON state in response to the control signal issued by the monitoring program 211 so as to electrically connect the USB bus 131.

In step S117, the electrical connection of the USB bus 131 causes the USB host controller 68 and the MEMORYSTICK slot 133 to be electrically connected. Hence, in step S118, the USB host controller 68 detects the presence of the MEMORYSTICK slot 133, and terminates the processing.

In step S115, if it is determined that the hardware bus switch 132 is ON, then it is unnecessary to change the state because the USB host controller 68 has detected the presence of the MEMORYSTICK slot 133. Hence, if it is determined in step S115 that the hardware bus switch 132 is ON, then the processing is terminated.

By the processing described in conjunction with FIG. 16, the hardware bus switch 132 is fixed to the ON state by the monitoring program 211 and the setting is changed to the hardware bus switch in constant connection mode regardless of whether the USB host controller 68 is currently detecting the presence of the MEMORYSTICK slot 133 or the absence of the MEMORYSTICK slot 133, as in the case described with reference to FIG. 9.

If the hardware bus switch in constant connection mode has been set, then the hardware bus switch 132 is fixed to the ON state by the monitoring program 211 and will not be changed even if the insertion or removal of the MEMORYSTICK is detected. In this case, the response time will be shorter than in the case where the processing explained in conjunction with FIGS. 14 and 15 is carried out.

Referring now to the flowchart of FIG. 17, processing 4 for changing the setting from the hardware bus switch in constant connection mode to the normal monitoring mode will be explained.

A user refers, for example, to the setting screen displayed on the LCD 25 to enter an instruction for changing the mode. The monitoring program 211 receives in step S131 a signal indicating the operational input by the user, and determines in step S132 whether the operational input for changing the setting from the hardware bus switch in constant connection mode to the normal monitoring mode has been received. If the monitoring program 211 determines in step S132 that the operational input for changing the setting from the hardware bus switch in constant connection mode to the normal monitoring mode has not been received, then the processing of step S132 is repeated until it is determined that the operational input for changing the mode has been received.

If it is determined in step S132 that the operational input for changing the setting from the hardware bus switch in constant connection mode to the normal monitoring mode has been received, then the monitoring program 211 changes the setting to the normal monitoring mode in step S133.

In step S134, the monitoring program 211 detects whether the potential of the n-th pin is high or low.

In step S135, the monitoring program 211 determines whether the MEMORYSTICK has been inserted or not on the basis of the potential of the n-th pin detected in step S134.

If it is determined in step S135 that the MEMORYSTICK has not been inserted, then the monitoring program 211 issues, in step S136, a control signal for turning the hardware bus switch 132 OFF to the hardware bus switch 132.

In step S137, the hardware bus switch 132 changes its ON state to the OFF state in response to the control signal issued by the monitoring program 211 so as to electrically disconnect the USB bus 131.

In step S137, the electrical disconnection of the USB bus 131 causes the USB host controller 68 and the MEMORYSTICK slot 133 to be electrically disconnected. Hence, in step S138, the USB host controller 68 detects the absence of the MEMORYSTICK slot 133, and terminates the processing.

In step S135, if it is determined that the MEMORYSTICK has been inserted, then the hardware bus switch 132 does not have to change the state. Hence, if it is determined in step S135 that the MEMORYSTICK has been inserted, then the processing is terminated.

Figure 17:
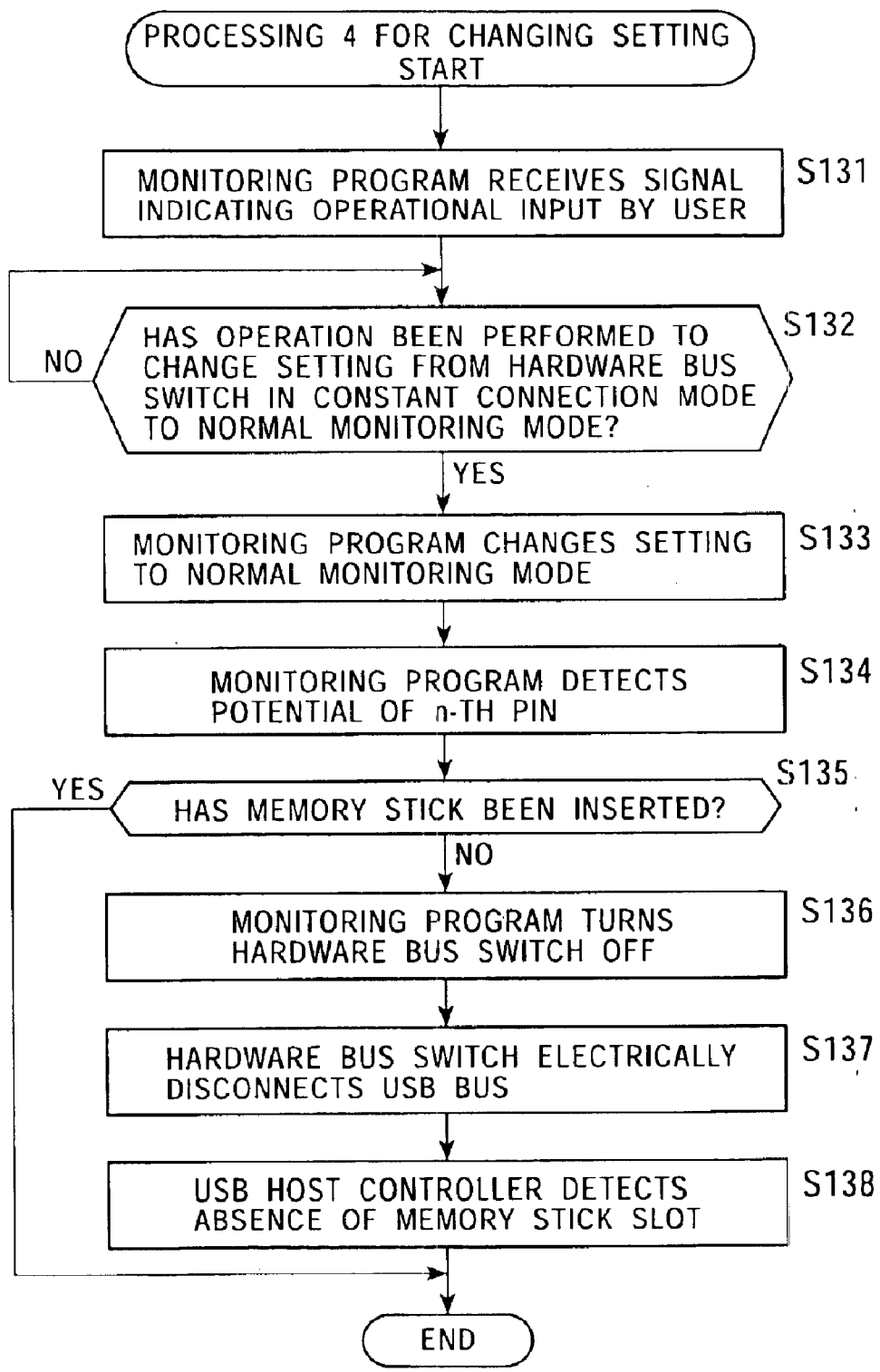
FIG. 17 is a flowchart for explaining processing 4 for changing a setting.

By the processing explained in conjunction with FIG. 17, the monitoring program 211 detects whether the MEMORYSTICK is in the MEMORYSTICK slot 133, determines whether the hardware bus switch 132 should be turned ON or OFF, and changes the setting from the hardware bus switch in constant connection mode to the normal monitoring mode.

By the processing described above, whether the MEMORYSTICK slot 133 is in actual operation or in actual use, that is, whether the MEMORYSTICK has been inserted is detected. Based on the detection result, the turning ON/OFF of the hardware bus switch 132 is controlled so as to cause the USB host controller 68 to detect that the MEMORY- STICK slot 133 has been connected or that the MEMORY-STICK slot 133 has not been connected. Thus, it is possible for the USB host controller 68 to securely detect, with a simple construction, that the MEMORYSTICK slot 133 has not been connected without the need for removing the MEMORYSTICK slot 133 when the MEMORYSTICK slot 133, which is a USB device provided on a control board, is not in actual use.

Accordingly, if no other USB device is in connection with the USB host controller 68 and if the MEMORYSTICK slot 133 is not in actual use, then the USB host controller 68 does not send any interrupts to the CPU 51, allowing the CPU 51 to shift to a low power consumption mode.

Furthermore, if the MEMORYSTICK slot 133 is not in actual use, then the MEMORYSTICK slot 133 is electrically disconnected, so that the supply of power to the MEMORYSTICK slot 133 is also interrupted. This will cut down the power consumption of the entire system.

In comparison with the first embodiment, the second embodiment does not need the exchange of information between the CPU 51 and the CPU 72 of the EC 130. The present invention can be implemented by using an appropriate forms, depending upon the processing capabilities of the CPU 51 and the CPU 72.

The processing carried out by the CPU 72 of the EC 130 in the second embodiment may alternatively be carried out by the CPU 51.

In the first and second embodiments according to the present invention, the potential of a predetermined pin has been detected so as to determine whether the MEMORYSTICK is present in the MEMORYSTICK slot 133. It is obvious, however, that the presence of the MEMORYSTICK can be detected by using other means, such as a mechanical switch, or an optical sensor.

Furthermore, in the first and second embodiments, the descriptions have been given, using the MEMORYSTICK slot 133 as the USB device. The present invention, however, can be applied to other cases where any type of an unremovable USB device is provided, including a case where a slot for mounting a different device from a MEMORYSTICK is provided on a board or a case where other USB device is directly connected to the board.

For instance, the present invention can be applied to a case where a slot is provided on a board, the slot being intended for mounting a "Media Card," such as an SD MEMORYCARD (trademark) or SMARTMEDIA (trademark) or diverse types of semiconductor memories, such as a COMPACTFLASH (registered trademark), or a storage device incorporating a controller module in one of these semiconductor memories.

Moreover, the present invention can be applied also to a case where a slot for mounting network card for building up various types of networks, such as a local area network (LAN) or a radio communication card using BLUETOOTH or the like is provided on a board. Even when a network module, a radio communication module or the like that is capable of carrying out the same processing as that of a network card, a radio communication card, or the like, but does not have a card configuration is provided on a control board in advance, it is needless to say that the present invention makes it possible to detect whether the modules are in use and to control the turning ON/OFF of a hardware bus switch on the basis of the result of the detection so as to obtain the same advantage.

In addition, the present invention can be applied to a case where a slot is provided on a board, the slot being intended for mounting a camera card or module capable of shooting images by incorporating a global positioning system (GPS) card or module, such as a charge-coupled device (CCD), for receiving radio waves from a GPS satellite, a fingerprint check card or module that has a CCD for shooting a fingerprint and a window touched by a finger so as to allow fingerprint information to be obtained, or other modules or cards capable of carrying out a variety of types of processing.

Moreover, the present invention can be applied to connectors or slots for attaching or connecting predetermined detachable devices, besides USB devices.

In the first and second embodiments, the descriptions have been given, using the personal computer 1 as an example. The present invention is, however, applicable also to, for instance, a personal digital (data) assistant (PDA), a portable telephone, a personal HANDYPHONE system (PHS), a car navigation system, or other diverse types of apparatus to which USB devices can be connected.

The software for carrying out the series of processing described above is executed by a computer having the program constituting the software installed in dedicated hardware, or installed from a recording medium into, for example, a general-purpose personal computer or the like, capable of carrying out diverse functions by installing various programs.

As shown in FIG. 5, the aforesaid recording medium is constructed of a package medium or the like formed of a magnetic disk 121 (including a flexible disk), an optical disc 122 (including a compact disk-read only memory (CD-ROM), and a digital versatile disk (DVD)), a magneto-optical disc 123 (MINI-DISK (MD, trademark), a semiconductor memory 124, or the like in which the programs have been recorded and which are distributed to users to provide them with the programs.

The steps constituting the programs in the present specification not only include the steps of processing carried out in time series in the sequences described, but also the steps of processing in parallel or individually rather than being implemented in time series.

What is claimed is:

1. An information processing unit having a slot to which a predetermined device is connected, comprising:
   device controlling means that is connectable to the predetermined device via the slot, detects the predetermined device through electrical connection with the predetermined device, and controls the processing of the predetermined device;
   switching means for establishing electrical connection or disconnection between the device controlling means and the slot;
   detecting means for detecting whether the slot is in use; and
   controlling means for controlling the switching of the electrical connection and disconnection between the device controlling means and the slot by the switching means on the basis of a detection result provided by the detecting means.

2. The information processing unit according to claim 1, wherein
   the slot is provided on a control board incorporated in the information processing unit.

3. The information processing unit according to claim 1, wherein
   the slot is unremovably installed in the information processing unit.

4. The information processing unit according to claim 1, wherein the detecting means detects whether the slot is in use on the basis of whether the predetermined device has been inserted in the slot.

5. The information processing unit according to claim 1, wherein the switching means physically switches the electrical connection and disconnection between the device controlling means and the slot.

6. The information processing unit according to claim 1, wherein the detecting means detects whether the slot is in use on the basis of the potential of a predetermined pin of the slot.

7. The information processing unit according to claim 1, further comprising:

input means for receiving an operational input by a user; and setting means for setting the control of the switching of the switching means by the controlling means to an "in constant connection" mode in response to an operation performed by the user that is entered through the input means.

8. The information processing unit according to claim 1, wherein the device controlling means is connectable to the predetermined device including the slot by using a USB standard, and the device controlling means is a USB host controller.

9. An information processing method for an information processing unit having:

a slot to which a predetermined device is connected;

a controller that is connectable to the predetermined device via the slot, and detects the predetermined device through electrical connection with the predetermined device so as to control the processing of the predetermined device; and a switch for switching between electrical connection and disconnection between the controller and the slot, the information processing method comprising:

a detection step for detecting whether the slot is in use; and a controlling step for controlling the switching between the electrical connection and disconnection between the controller and the slot by the switch on the basis of a detection result from the processing in the detection step.

10. A program executable by a computer that controls an information processing unit having:

a slot to which a predetermined device is connected;

a controller that is connectable to the predetermined device via the slot, and detects the predetermined device through electrical connection with the predetermined device so as to control the processing of the predetermined device; and a switch for switching between electrical connection and disconnection between the controller and the slot, the program comprising:

detection processing for detecting whether the slot is in use; and a control processing for controlling the switching between the electrical connection and disconnection between the controller and the slot by the switch on the basis of a detection result from the detection processing.

11. An information processing unit comprising:

a connector to which a predetermined device is connected;

a controller electrically connected to the connector;

a switch disposed between the controller and the connector; and a controlling device that is connected to the connector and the switch, receives from the connector a status signal representing the connection state of the predetermined device to the connector, and outputs to the switch a control signal instructing to open or close the switch on the basis of the status signal, wherein the switch controls the electrical connection between the controller and the connector in response to a control signal from the control device.

* * * * *